United States Patent
Kawashima et al.

(10) Patent No.: US 8,593,417 B2
(45) Date of Patent: Nov. 26, 2013

(54) OPERATION APPARATUS FOR IN-VEHICLE ELECTRONIC DEVICE AND METHOD FOR CONTROLLING THE SAME

(75) Inventors: Takeshi Kawashima, Nisshin (JP); Koichi Masuda, Obu (JP)

(73) Assignee: Denso Corporation, Kariya (JP)

( * ) Notice: Subject to any disclaimer, the term of this patent is extended or adjusted under 35 U.S.C. 154(b) by 591 days.

(21) Appl. No.: 12/799,646

(22) Filed: Apr. 29, 2010

(65) Prior Publication Data

US 2010/0277438 A1    Nov. 4, 2010

(30) Foreign Application Priority Data

Apr. 30, 2009   (JP) .................................. 2009-111401

(51) Int. Cl.
*G06F 3/041* (2006.01)
(52) U.S. Cl.
USPC .......................................... 345/173; 345/156
(58) Field of Classification Search
USPC .................................................. 345/156–173
See application file for complete search history.

(56) References Cited

U.S. PATENT DOCUMENTS

| | | | |
|---|---|---|---|
| 6,407,733 B1 * | 6/2002 | Kawakami | 345/204 |
| 2005/0267676 A1 | 12/2005 | Nezu et al. | |
| 2006/0122769 A1 | 6/2006 | Hotehama | |
| 2006/0256094 A1 * | 11/2006 | Inagaki | 345/173 |
| 2007/0124070 A1 * | 5/2007 | Kawai et al. | 701/211 |
| 2007/0230929 A1 * | 10/2007 | Niwa et al. | 396/15 |
| 2007/0262965 A1 * | 11/2007 | Hirai et al. | 345/173 |
| 2007/0262970 A1 * | 11/2007 | Matsumoto et al. | 345/173 |
| 2008/0163131 A1 * | 7/2008 | Hirai et al. | 715/863 |
| 2008/0211832 A1 * | 9/2008 | Kumon | 345/641 |
| 2008/0231608 A1 * | 9/2008 | Nagata | 345/173 |
| 2011/0004822 A1 | 1/2011 | Nezu et al. | |

FOREIGN PATENT DOCUMENTS

| | | |
|---|---|---|
| JP | 3-116193 | 5/1991 |
| JP | 8-076926 | 3/1996 |
| JP | 10-282948 | 10/1998 |
| JP | 11-102274 | 4/1999 |
| JP | 2001-216069 | 8/2001 |
| JP | 2005-339420 | 12/2005 |
| JP | 2006-162267 | 6/2006 |

(Continued)

OTHER PUBLICATIONS

Office action dated Mar. 24, 2011 in corresponding Japanese Application 2009-111401.

(Continued)

*Primary Examiner* — Viet Pham
(74) *Attorney, Agent, or Firm* — Harness, Dickey & Pierce, PLC

(57) ABSTRACT

An operation surface detects a touch point specified by an operator. An imaging area obtains a hand image of the operator. A fingertip detection unit detects a fingertip of the hand image. A display device includes a display screen having coordinates uniquely corresponding to the operation surface and the imaging area. The display device indicates the fingertip and an operation panel specific to an in-vehicle electronic device to be operated. An interface engine having a prescribed interface relationship between an input, which is specified by at least one of the touch point and the fingertip, and an output to be outputted to the in-vehicle electronic device according to a combination of the input and the interface relationship. An alteration unit alters the interface relationship according to a detected traveling state of the vehicle.

5 Claims, 18 Drawing Sheets

(56) References Cited

FOREIGN PATENT DOCUMENTS

| JP | 2007-212342 | 8/2007 |
|----|-------------|--------|
| JP | 2007-236008 | 9/2007 |
| JP | 2008-234594 | 10/2008 |
| JP | 2009-042796 | 2/2009 |
| JP | 2000-222130 | 8/2011 |
| WO | WO 2009/116285 | 9/2009 |

OTHER PUBLICATIONS

Office action dated Mar. 13, 2013 in corresponding Japanese Application 2011-114556.

* cited by examiner

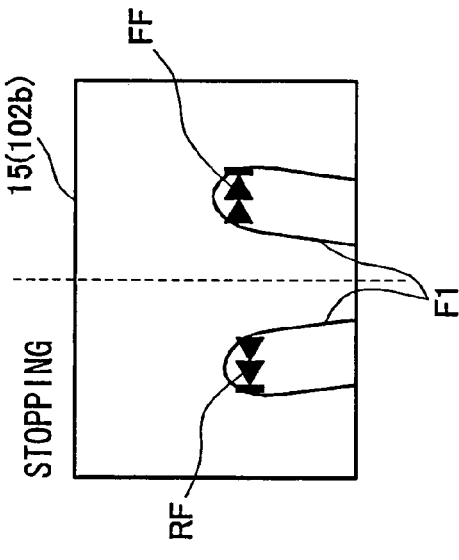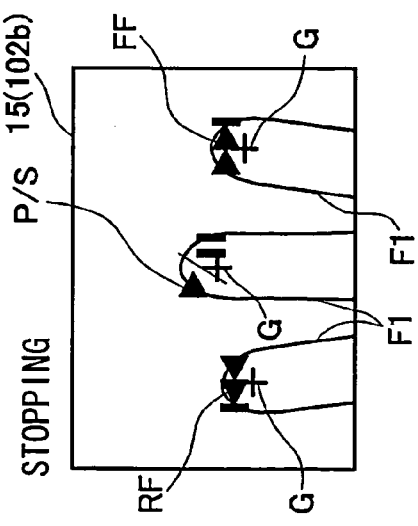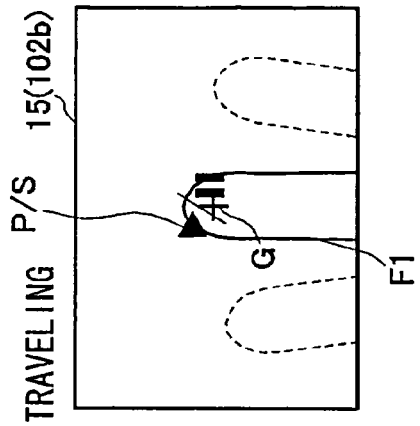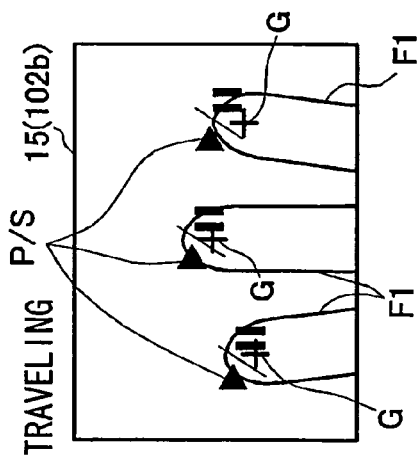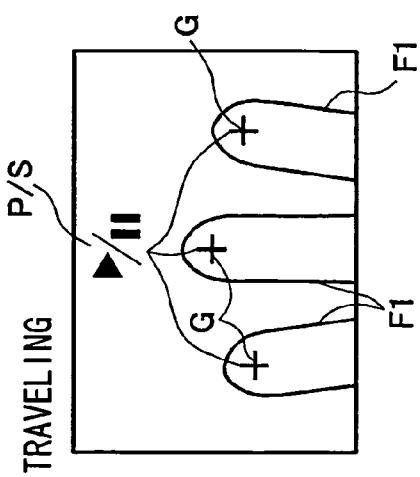

FIG. 15
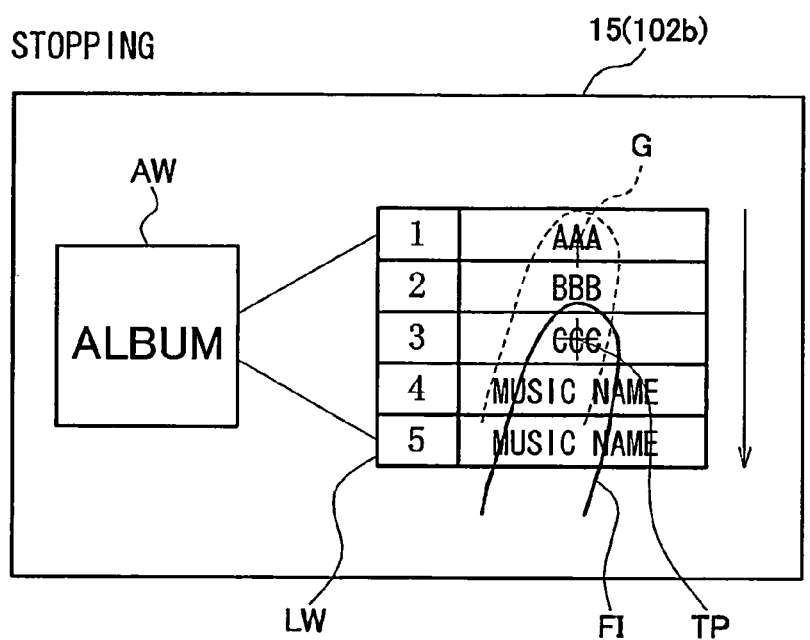
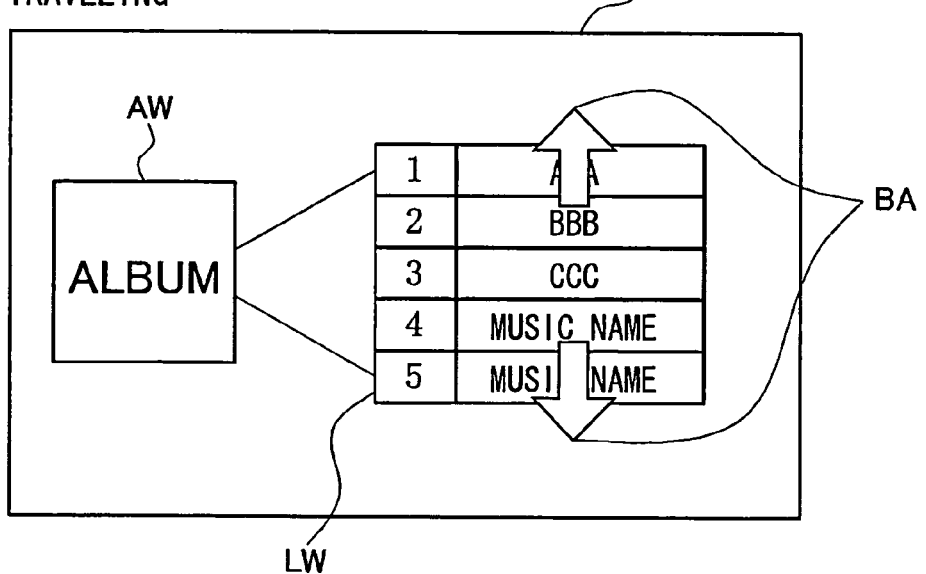

OPERATION APPARATUS FOR IN-VEHICLE ELECTRONIC DEVICE AND METHOD FOR CONTROLLING THE SAME

CROSS REFERENCE TO RELATED APPLICATIONS

This application is based on and incorporates herein by reference Japanese Patent Application No. 2009-111401 filed on Apr. 30, 2009.

FIELD OF THE INVENTION

The present invention relates to an operation apparatus for an in-vehicle electronic device. The present invention further relates to a method for controlling the operation apparatus.

BACKGROUND OF THE INVENTION

Conventionally, an operation apparatus for an in-vehicle device such as a car navigation device has been proposed. For example, such an operation apparatus obtains a photographic image of a hand of an operator with a camera, extracts a finger image from the obtained photographic image, and superimposes the extracted finger image on a graphical user interface (GUI) input screen such as a navigation screen of an in-vehicle device. For example, U.S. Pat. No. 6,407,733 (JP-A-2000-335330) discloses a device configured to obtain a photographic image of a hand of an occupant, which manipulates a touch panel near a seat of the occupant, using a camera mounted on a ceiling of a vehicle body. The device is further configured to indicate the obtained photographic image of the hand and a touch panel on a liquid, crystal display, which is opposed to the occupant. JP-A-2001-216069 discloses an operation input device configured to assign different operation contents according to the distance between a screen of a display device and a user's finger or the like.

In the conventional operating systems, the image information such as the image of a hand obtained with a camera is used only for superpose-indication of an outline image of the hand for indicating the operation position on the screen. Thus, the image information may not have been effectively used as input information. In particular, during a driving operation of a vehicle, a driver cannot gaze at the screen of the operation apparatus. Accordingly, the driver tends to cause an erroneous operation. In addition, it is hard to perform a complicated operation during a driving operation of a vehicle. The operation apparatus of U.S. Pat. No. 6,407,733 uses two input information including the photographic image information on a hand and touch detection information. However, the two input information may not be effectively utilized for enhancing an operability.

SUMMARY OF THE INVENTION

In view of a foregoing and other problems, it is an object of the present invention to produce an operation apparatus for an in-vehicle electronic device, the operation apparatus configured to significantly enhance an operability by effectively utilizing both a touch input device and an imaging device when a user cannot gaze at a screen of an operation apparatus. It is an object of the present invention to produce a method for controlling the operation apparatus.

According to one aspect of the present invention, an operation apparatus mounted to a vehicle for operating an in-vehicle electronic device, the operation apparatus comprises an input device having an operation surface configured to receive a touch operation of an operator to detect a touch point specified by the touch operation. The operation apparatus further comprises an imaging device having an imaging area having coordinates uniquely corresponding to the operation surface, the imaging device configured to obtain hand image of a hand of the operator, the hand being close to the operation surface. The operation apparatus further comprises a fingertip detection unit configured to detect a fingertip of the hand based on the hand image obtained by the imaging device. The operation apparatus further comprises a display device including a screen having coordinates uniquely corresponding to the operation surface and the imaging area. The operation apparatus further comprises a first indication control unit configured to cause the screen to indicate an instruction object specifying the fingertip. The operation apparatus further comprises a second indication control unit configured to cause the screen to indicate an operation panel specific to the in-vehicle electronic device to be operated. The operation apparatus further comprises a user interface engine having a prescribed interface specification being a relationship between an instruction input and an instruction output, the instruction input being specified by at least one of the detected touch point and the detected fingertip, the user interface engine configured to output the instruction output to the in-vehicle electronic device to be operated according to the interface specification and the instruction input. The operation apparatus further comprises a traveling state detection unit configured to detect a traveling state of the vehicle. The operation apparatus further comprises an alteration unit configured to alter the interface specification according to the detected traveling state.

According to another aspect of the present invention, an operation apparatus mounted to a vehicle for operating an in-vehicle electronic device, the operation apparatus comprises an input device having an operation surface configured to receive a touch operation of an operator to detect a touch point specified by the touch operation. The operation apparatus further comprises an imaging device having an imaging area having coordinates uniquely corresponding to the operation surface, the imaging device configured to obtain hand image of a hand of the operator, the hand being close to the operation surface. The operation apparatus further comprises a fingertip detection unit configured to detect a plurality of fingertips of the hand based on the hand image obtained by the imaging device. The operation apparatus further comprises a display device including a screen having coordinates uniquely corresponding to the operation surface and the imaging area. The operation apparatus further comprises a first indication control unit configured to cause the screen to indicate an instruction object specifying the fingertip. The operation apparatus further comprises a second indication control unit configured to cause the screen to indicate an operation panel specific to the in-vehicle electronic device to be operated. The operation apparatus further comprises a user interface engine having a prescribed interface specification being a relationship between an instruction input and an instruction output, the instruction input being specified by at least one of the detected touch point and the detected fingertip, the user interface engine configured to output the instruction output to the in-vehicle electronic device to be operated according to the interface specification and the instruction input. The operation apparatus further comprises an alteration unit configured to alter the interface specification according to a number of the fingertip detected by the fingertip detection unit.

According to another aspect of the present invention, an operation apparatus mounted to a vehicle for operating an in-vehicle electronic device, the operation apparatus comprises an input device having an operation surface configured to receive a touch operation of an operator to detect a touch point specified by the touch operation. The operation apparatus further comprises an imaging device having an imaging area having coordinates uniquely corresponding to the operation surface, the imaging device configured to obtain hand image of a hand of the operator, the hand being close to the operation surface. The operation apparatus further comprises a fingertip detection unit configured to detect a fingertip of the hand based on the hand image obtained by the imaging device. The operation apparatus further comprises a display device including a screen having coordinates uniquely corresponding to the operation surface and the imaging area. The operation apparatus further comprises a first indication control unit configured to cause the screen to indicate an instruction object specifying the fingertip. The operation apparatus further comprises a second indication control unit configured to cause the screen to indicate an operation panel specific to the in-vehicle electronic device to be operated. The operation apparatus further comprises a user interface engine having a prescribed interface specification being a relationship between an instruction input and an instruction output, the instruction input being specified by at least one of the detected touch point and the detected fingertip, the user interface engine configured to output the instruction output to the in-vehicle electronic device to be operated according to the interface specification and the instruction input. The operation apparatus further comprises an alteration unit configured to alter the interface specification according to whether the input device detects a touch operation to the input device simultaneously when the fingertip detection unit detects a fingertip.

According to another aspect of the present invention, a method for controlling an operation apparatus to operate an in-vehicle electronic device, the method comprises detecting a touch point specified on an operation surface by a touch operation of an operator. The method further comprises obtaining a hand image of a hand of the operator, the hand being at least partially located in an imaging area. The method further comprises detecting a fingertip of the obtained hand image. The method further comprises indicating the fingertip and an operation panel on a screen, the operation panel being specific to the in-vehicle electronic device to be operated, the screen having coordinates uniquely corresponding to the operation surface and the imaging area. The method further comprises detecting a traveling state of the vehicle. The method further comprises altering an interface relationship between an instruction input and an instruction output according to the detected traveling state, the instruction input being specified by at least one of the detected touch point and the detected fingertip. The method further comprises outputting the instruction output to the in-vehicle electronic device according to a combination of the interface relationship and the instruction input.

According to another aspect of the present invention, a method for controlling an operation apparatus to operate an in-vehicle electronic device, the method comprises detecting a touch point specified on an operation surface by a touch operation of an operator. The method further comprises obtaining a hand image of a hand of the operator, the hand being at least partially located in an imaging area. The method further comprises detecting at least one fingertip of the obtained hand image. The method further comprises indicating the fingertip and an operation panel on a screen, the operation panel being specific to the in-vehicle electronic device to be operated, the screen having coordinates uniquely corresponding to the operation surface and the imaging area. The method further comprises altering an interface relationship between an instruction input and an instruction output according to a number of the at least one detected fingertip, the instruction input being specified by at least one of the detected touch point and the detected fingertip. The method further comprises outputting the instruction output to the in-vehicle electronic device according to a combination of the interface relationship and the instruction input.

According to another aspect of the present invention, a method for controlling an operation apparatus to operate an in-vehicle electronic device, the method comprises detecting a touch point specified on an operation surface by a touch operation of an operator. The method further comprises obtaining a hand image of a hand of the operator, the hand being at least partially located in an imaging area. The method further comprises detecting a fingertip of the obtained hand image. The method further comprises indicating the fingertip and an operation panel on a screen, the operation panel being specific to the in-vehicle electronic device to be operated, the screen having coordinates uniquely corresponding to the operation surface and the imaging area. The method further comprises altering an interface relationship between an instruction input and an instruction output according to whether the touch point and the fingertip are simultaneously detected, the instruction input being specified by at least one of the detected touch point and the detected fingertip. The method further comprises outputting the instruction output to the in-vehicle electronic device according to a combination of the interface relationship and the instruction input.

BRIEF DESCRIPTION OF THE DRAWINGS

The above and other objects, features and advantages of the present invention will become more apparent from the following detailed description made with reference to the accompanying drawings. In the drawings:

FIGS. 13A to 13E are views showing a third example of the interface specification data according to the first embodiment;

FIG. 15 is a view showing a fifth example of the interface specification data;

DETAILED DESCRIPTION OF PREFERRED EMBODIMENTS

Embodiment

Figure 1:
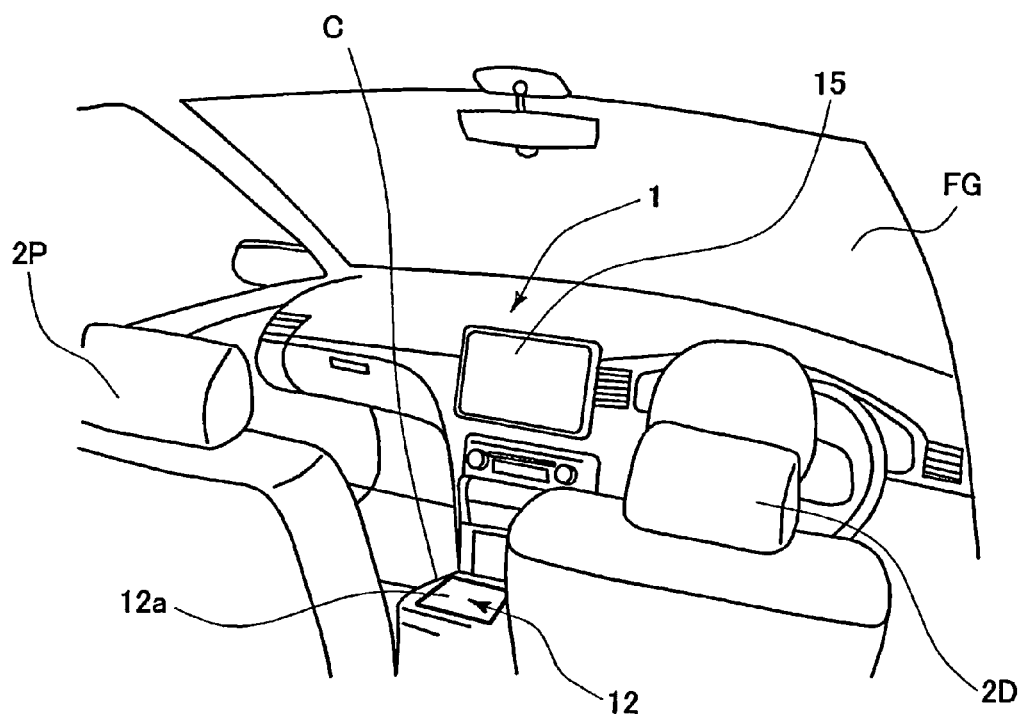
FIG. 1 is a perspective view showing one example of an operation apparatus mounted in a vehicle.

As follows, an embodiment will be described with reference to drawings. FIG. 1 is a perspective view showing one example of an operation apparatus for an in-vehicle electronic device applied with an image display device. The operation apparatus 1 is located in an interior of a vehicle such as an automobile. The operation apparatus 1 includes a monitor device (display device) 15 located in a center portion of an instrument panel and an operation unit (input unit, touch panel, touch input device) 12 located in a center console C such that an occupant can manipulate the operation unit 12 from either a driver seat 2D or a passenger seat 2P. The purpose of the operation unit 12 is not limited. For example, an occupant may use the operation unit 12 for manipulating a car navigation device and/or a car audio device while looking at a screen of the monitor device 15 provided in the center console. The operation unit 12 is mounted so that an input surface of the operation unit 12 is directed upward. The input surface of the operation unit 12 may include, for example, a generally-known touch panel 12a having a resistive film type structure, a surface acoustic wave type structure, or a capacitance type structure. The touch panel 12a is configured as a transparent instruction panel having a base material of a transparent resin sheet or a glass sheet. The touch panel 12a has an upper surface for receiving a touch operation of a fingertip of an operator. An input coordinate system is set on the sheet surface correspondingly to the screen area of the monitor device 15.

Figure 2:
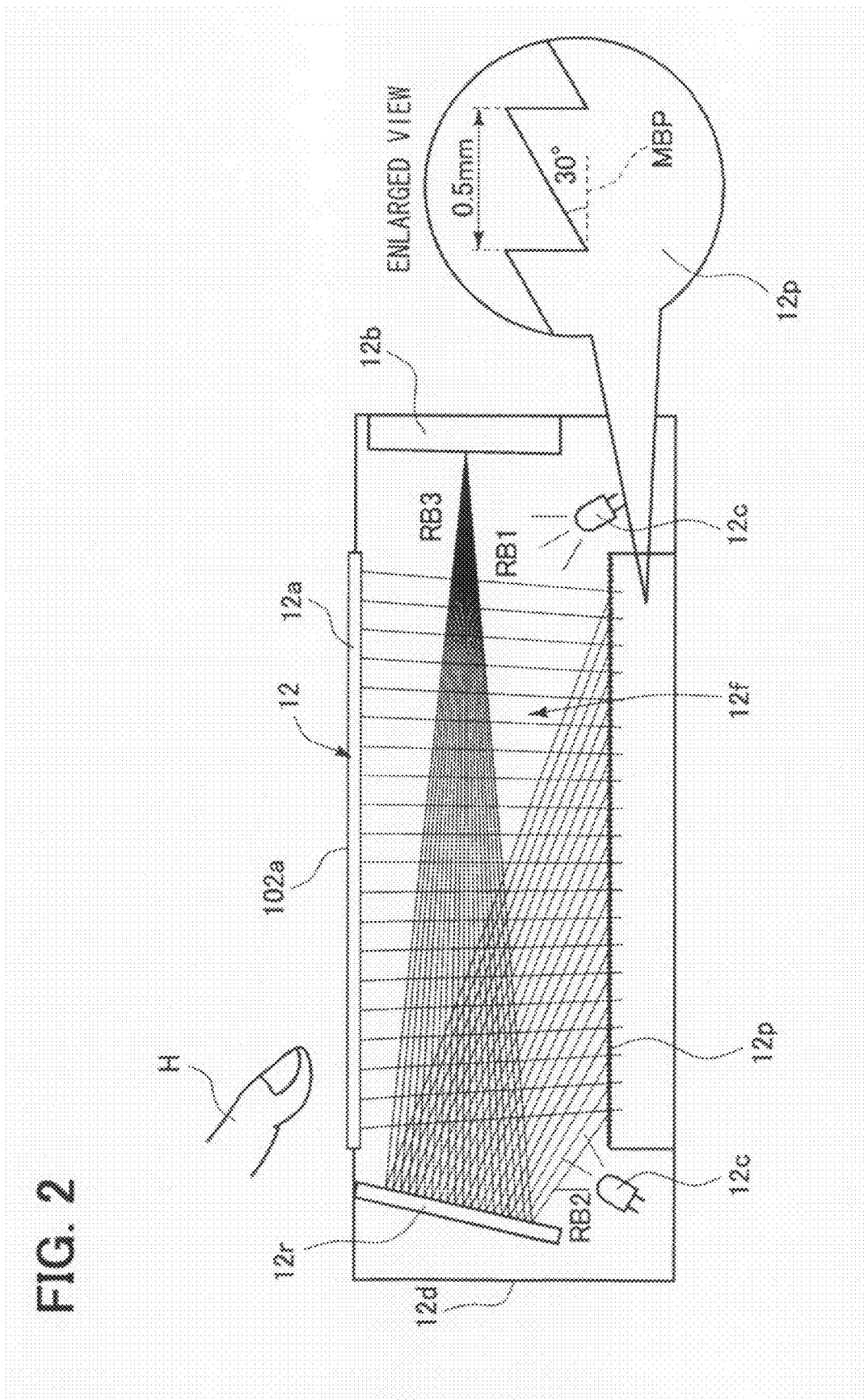
FIG. 2 is a cross sectional view showing one example of an internal structure of an operation unit of the operation apparatus.

FIG. 2 is a sectional view showing an internal structure of the input unit 12. The touch panel 12a is fitted in an upper surface of a case 122e so that the input surface 102b is located at the top side. A hand imaging camera (imaging device) 12b, an illumination light source 12c, and an imaging optical system are accommodated in a case 12d and configured as an image obtaining unit. The illumination light source 12c is, for example, a light emitting diode configured as a monochromatic light source. The illumination light source 12c has a convex-shaped mold to enhance a directivity of luminescence toward an upper side of the illumination light source 12c. The illumination light source 12c includes multiple light source elements to surround a lower surface of the touch panel 12a. Each element of the illumination light source 12c has a molded tip end, which causes high luminescence, inclined and directed toward the lower surface of the touch panel 12a. The illumination light source 12c is mounted so that a palm surface of a hand H of an operator on the input surface 102b causes a primary image reflected light RB1 downward through the touch panel 12a. The imaging optical system has a first reflection part 12p and a second reflection part 12r. The first reflection part 12p is configured as a prism plate 12p located directly under the touch panel 12a and opposed to the touch panel 12a. The prism plate 12p is a transparent plate having a surface defining minute triangular-column-shaped prisms arranged in parallel with each other. The first reflection part 12p reflects the primary image reflected light RB1 of the operator's hand H obliquely upward, thereby to cause a secondary image reflected light RB2 outside of an opposed space 12f between the prism plate 12p and the touch panel 12a. The second reflection part 12r is a flat reflector 12r located on the lateral side of the opposed space 12f. The second reflection part 12r is located outside of the opposed space 12f. The second reflection part 12r reflects the secondary image reflected light RB2 toward the lateral side, thereby to cause a tertiary image reflected light RB3 on the hand imaging camera 12b. The hand imaging camera 12b is located on the opposite side of the second reflection part 12r through the opposed space 12f. The hand imaging camera 12b is provided in a position corresponding to a focus position of the tertiary image reflected light RB3 for obtaining an image of the hand H including an operator's finger.

As shown in the enlarged view in FIG. 2, the prism plate 12p includes minute rib-shaped prisms arranged along a mirror reference surface MBP. The minute prisms of the prism plate 12p are arranged close to each other and in parallel with each other. Each of the minute prisms has a reflective surface inclined at a constant angle relative to the mirror reference surface MBP. The prism plate 12p is configured to reflect light, which comes in its normal-line direction, obliquely toward the lateral side even when the prism plate 12p is not inclined. Therefore, the first reflection part 12p for causing lateral reflection can be located at the lower side of the touch panel 12a to be opposed to the touch panel 12a and in parallel with the touch panel 12a. Thus, the size of the first reflection part 12p in the vertical direction size of the opposed space 12f can be significantly reduced.

In addition, the opposed space 12f is interposed, between the second reflection part 12r and the hand imaging camera 12b, which are opposed to each other. Thereby, the tertiary image reflected light RB, which directly enters into the hand imaging camera 12b can be directed so as to pass through the opposed space 12f. In the present structure, the second reflection part 12r and the hand imaging camera 12b can be located close to the lateral sides of the touch panel 12a. In addition, the incidence path of the image reflected light, which comes from the hand H to the hand imaging camera 12b, is folded into three within the opposed space 12f. Therefore, the entire optical imaging system can be significantly downsized, and the thickness of the case 12d can be also reduced. In particular, the input unit 12 can be significantly thin-shaped and reduced in the size by reducing the size of the input surface 102b of the touch panel 12a in the vertical and horizontal directions. Thus, the input unit 12 can be mounted to a vehicle, in which the width of the center console section C (FIG. 1) is relatively small, or a vehicle in which only a limited mounting space can be secured on the front side of a shift lever.

The input surface 102b of the touch panel 12 corresponds to an imaging area 102b of the hand imaging camera 12b. The size of the input surface 102b in the vertical direction (Y-direction) is set to, for example, 60 to 90 mm (75 mm as one example), such that a part of a fingertip of a middle finger in the longitudinal direction is within the input surface 102b when a hand of an average adult person is assumed. In the present structure, only a portion of a finger on the tip side from the base of the finger is indicated in the screen area of the monitor device 15. Therefore, a palm portion other than the finger does not exert influence to the indication of the screen area. Thus, a below-mentioned indication operation using an instruction object image can significantly simplified. Furthermore, the size of the input surface 102b in the horizontal direction (X-direction) is, for example, 110 to 130 mm (120 mm as one example). When the hand is put above the input surface 102b, and when fingers of the hand are widely unbent, the index finger, the middle finger, the third finger, and the little finger of the hand are in the imaging area, and the thumb of the hand is outside of the imaging area. When fingers are suitably put close to each other, all the fingers may be put within the imaging area.

Figure 3:
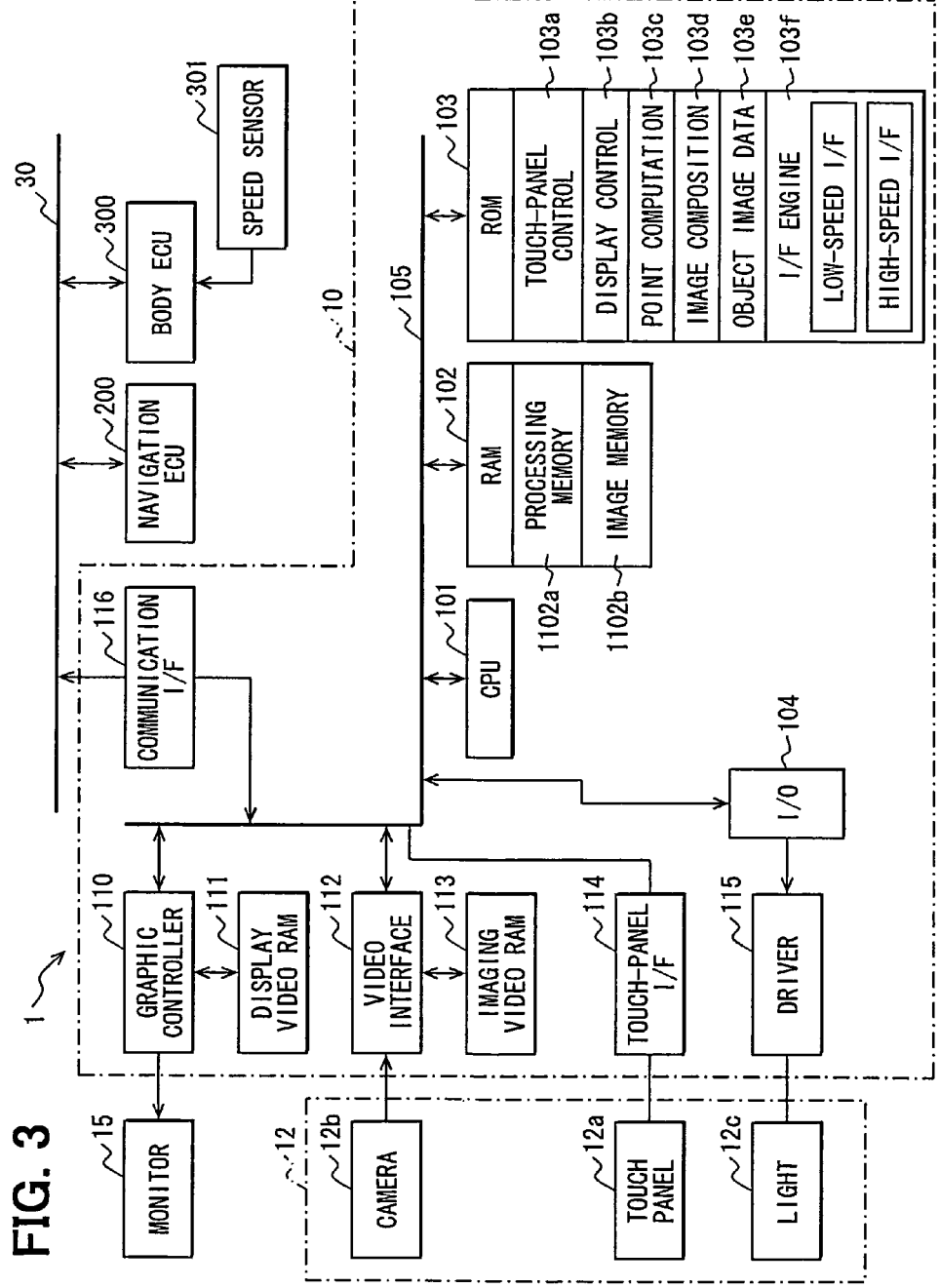
FIG. 3 is a block diagram showing one example of an electric structure of the operation apparatus of FIG. 1.

FIG. 3 is a block diagram showing an electronic connection among components of the operation apparatus 1. An operation ECU 10 functions as a main controller of the operation apparatus 1. The operation ECU 10 is a computer device mainly configured of a CPU 101. Specifically, the operation ECU 10 has a structure in which the CPU 101, a RAM 102, a ROM 103, a graphics controller 110, a video interface unit 112, a touch-panel interface unit 114, a general-purpose input and output (I/O) unit 104, and a serial communication interface unit 116 are interconnected with each other via an internal bus 105. The graphics controller 110 is connected with a display video RAM 111 and the monitor device 15. The video interface unit 112 is connected with an imaging video RAM and the hand imaging camera 12b. The touch panel 12a is connected with the touch-panel interface unit 114. The general-purpose input and output unit 104 is connected with the illumination light source 12c via a driver (driver circuit) 115. The serial communication interface unit 116 is connected with an in-vehicle serial communication bus 30 such as a CAN communication bus. The in-vehicle serial communication bus 30 is configured to intercommunicate with another ECU, such as a navigation ECU 200 for controlling a navigation device and a body ECU 300, connected via network communications.

The video interface unit 112 regularly receives an analog or digital image signal obtained by the hand imaging camera 12b. The image signal is stored as image frame data in an imaging video RAM 113 at a predetermined time interval. A memory content of the imaging video RAM is arbitrary updated when receiving new image frame data.

The graphics controller 110 obtains inputted screen image frame data from the navigation ECU 200 via the communication interface unit 116. In addition, the graphics controller 110 obtains an instruction object image, in which instruction object image frame data is put at a predetermined position, from the CPU 101. The graphics controller 110 performs, for example, a generally-known alpha blending operation to perform a frame composition of the obtained instruction object image in the display video RAM 111. Thus, the graphics controller 110 outputs the instruction object image to the monitor device 15.

The touch-panel interface unit 114 includes a drive circuit suitable for the type of the touch panel 12a. In addition, the touch-panel interface unit 114 detects an inputted position (inputted touch point) specified by a touch operation to the input surface 102b based on a signal inputted from the touch panel 12a. The touch-panel interface unit 114 outputs a detection result of the inputted position as inputted position coordinate information.

A two-dimensional coordinates correspondence is determined among the imaging area of the hand imaging camera 12b, the input surface of the touch panel 12, and the screen area of the monitor device 15. More specifically, a two-dimensional coordinates correspondence is determined among an image obtained by the hand imaging camera 12b, the input surface of the touch panel 12, and the input screen image frame data and the instruction object image frame data, which determine a content indicated on the monitor device 15. The ROM 103 stores the following software to be executed by the CPU 101.

Touch-Panel Control Software 103a:

The touch-panel control software 103a obtains the coordinates of the inputted touch point specified by a touch operation via the touch-panel interface unit 114. The touch-panel control software 103a further obtains reference information for determining an operated content and an inputted content. The reference information is sent from the navigation ECU 200 together with the input screen image frame data. The reference information includes, for example, region specification information on a soft button and an operated command content to be outputted when the soft button is touch-operated. The touch-panel control software 103a determines the present operated content and the present inputted content based on the obtained touch point coordinates and the obtained reference information. Thus, the touch-panel control software 103a outputs an execution instruction corresponding to the content to the navigation ECU 200.

Display Control Software 103b:

The display control software 103b outputs an import instruction to cause the graphics controller 110 to import the input screen image frame data. The display control software 103b further transfers instruction object image frame data, which is produced by a below-mentioned method, to the graphics controller 110.

Fingertip Point Computation Software 103c:

The fingertip point computation software is executed in a work area of a fingertip point processing memory 1102a of the RAM 1102. The fingertip point computation software functions as a tip end extracting unit, an image tip end position specifying unit, and a fingertip determination unit. The fingertip point computation software performs a computation to binarize a photographic image of an operator's hand obtained by the hand imaging camera 12b and performs a computation to specify a fingertip position in the actually obtained finger image of the hand. More specifically, the fingertip point computation software performs a computation to specify a predetermined representative point of a tip end region ta as an imaged fingertip point tp in an insertion direction of the binarized photographic image. In this case, the fingertip point computation software specifies a geometric centroid position as the predetermined representative point. The display control software 103b further determines whether the imaged fingertip point tp really specifies the fingertip point tp based on at least the size of the tip end region ta and the area of the tip end region ta. An output device of the video interface unit may include a binarizing circuit for binarizing pixels of an image, and the photographic image of the hand may be binarized by the binarizing circuit beforehand.

Figure 9:
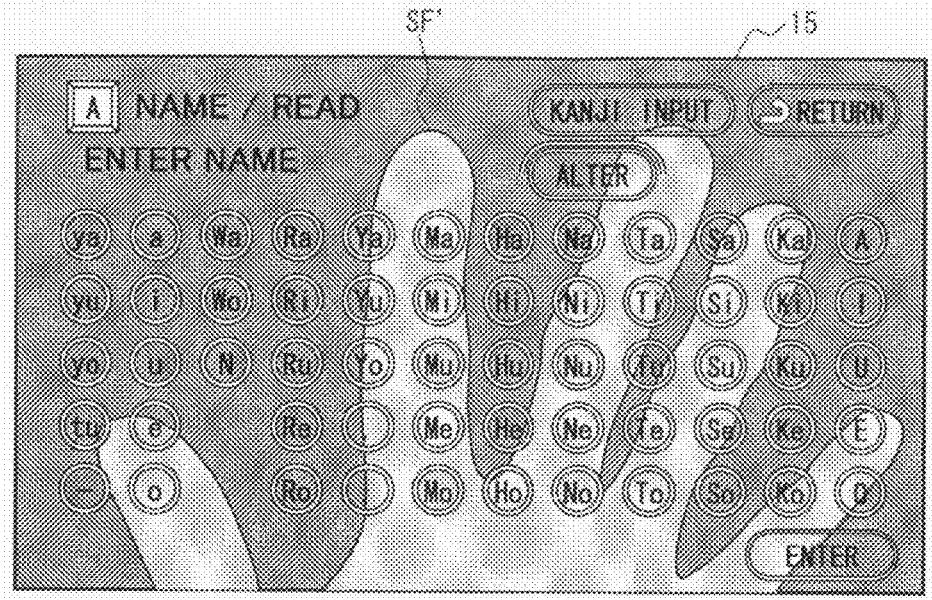
FIG. 9 is a view showing a hand image obtained by a hand imaging camera and superposed on an operation panel.
Figure 10:
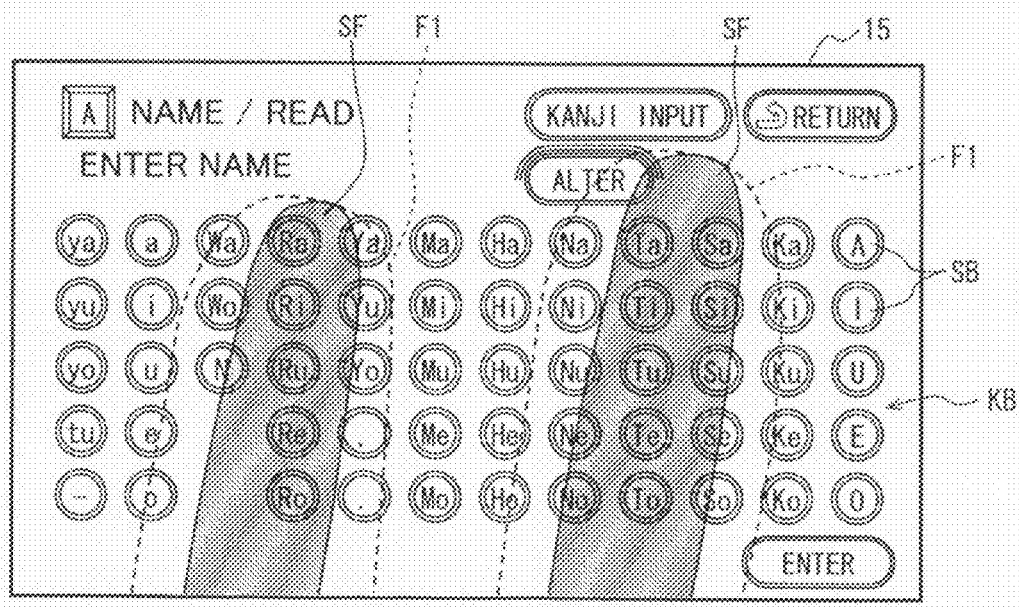
FIG. 10 is a view showing one example of an instruction object image superimposed and indicated on the screen.

Instruction Object Image Composition Software 103d:

The instruction object image composition software 103d is executed in a work area of an instruction object image composition memory 1102b of the RAM 1102. The instruction object image composition software 103d functions as an instruction object image indication unit. Specifically, as shown in FIG. 9, the instruction object image composition software 103d may compose the instruction object image by superposing a hand image SF' on the instruction object image and may indicate the superimposed image on the screen of the monitor device 15. Alternatively, as shown in FIG. 10, the instruction object image composition software 103d may compose the instruction object image by generating an instruction object image F1 of a finger, which has the width smaller than the width of the finger of the hand image, based on instruction object image data 103e generated separately from the photographic image. Thus, the instruction object image composition software 103d may superimpose the generated instruction object image F1 on the instruction object image and may indicate the superimposed image on the screen of the monitor device 15. In this case, the instruction object image composition software 103d performs a processing to put the instruction object image F1 on the instruction object image frame so that the fingertip position of the instruction object image F1 coincides with the imaged fingertip point.

User Interface Engine 103e:

The user interface engine 103e determines a prescribed interface specification, which is a relationship between an instruction input state, which is specified by at least one of the inputted touch point and the imaged fingertip point on the operation panel, and an operation instruction output content outputted to an in-vehicle electronic device such as a car navigation system and a car audio system. In addition, the user interface engine 103e outputs operation instruction information according to the interface specification and the instruction input state on the operation panel. The user interface engine 103e includes an interface specification modifying unit. The interface specification modifying unit has a function to arbitrarily modify the interface specification according to at least a traveling state of a vehicle (in particular, a vehicle speed), the number of an imaged fingertip point, determination result whether multiple touch operations on the touch input device 12 are simultaneously detected when an imaged fingertip point is detected, and the like.

As follows, a method for specifying the imaged fingertip point of the hand by using the operation apparatus 1 will be described with reference to a flow chart. The fingertip point computation software 103c performs a main operation of the present method. It is assumed that the screen (region) of the monitor device 15 indicates a keyboard input screen of FIG. 10 excluding the hand image SF, in response to a command input such as a touch input operation on another screen. It is noted that another input screen such as a map screen may be indicated in this case.

Figure 4:
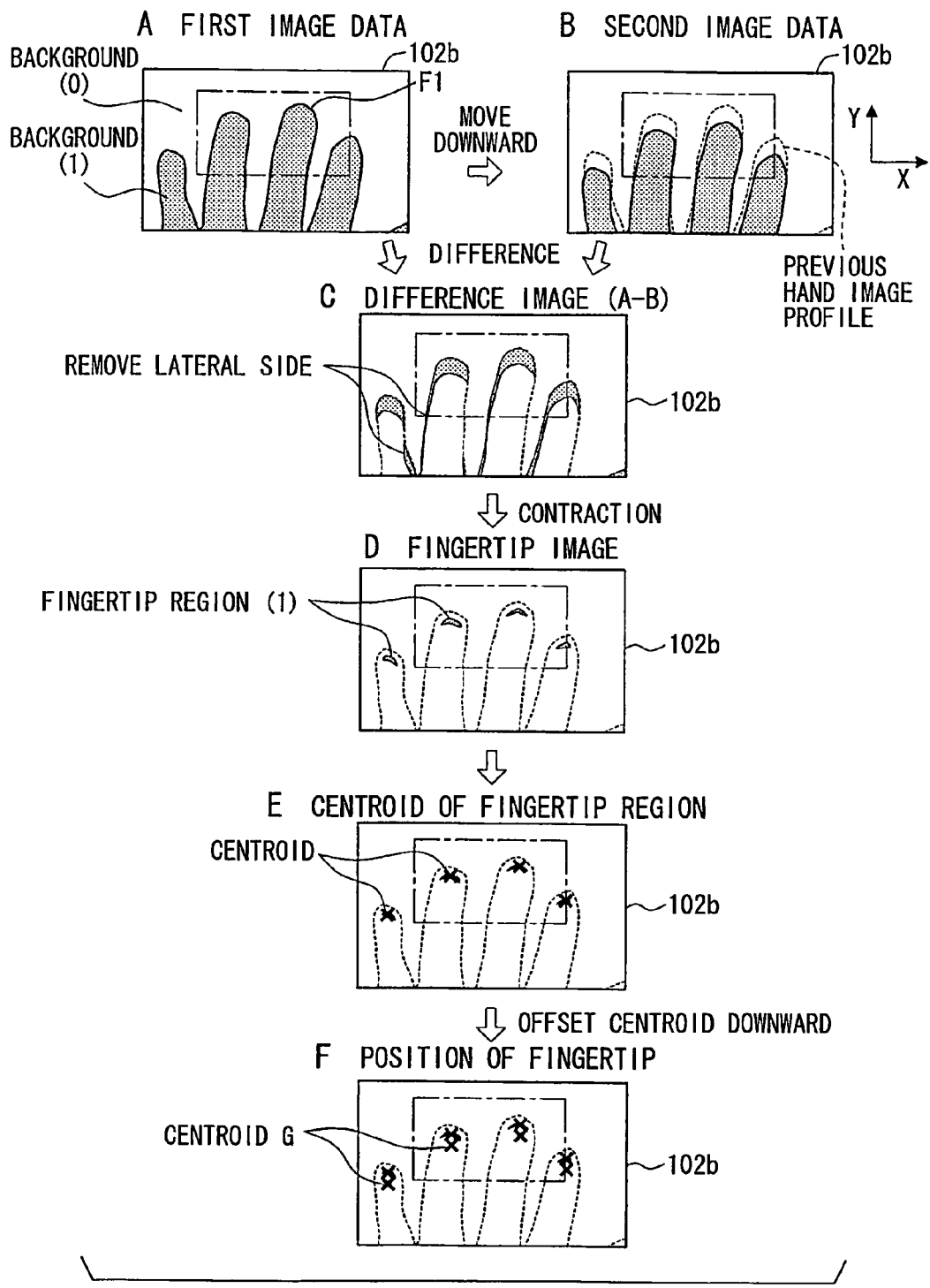
FIG. 4 is an explanatory view showing an image processing for determining an imaged fingertip point.
Figure 5:
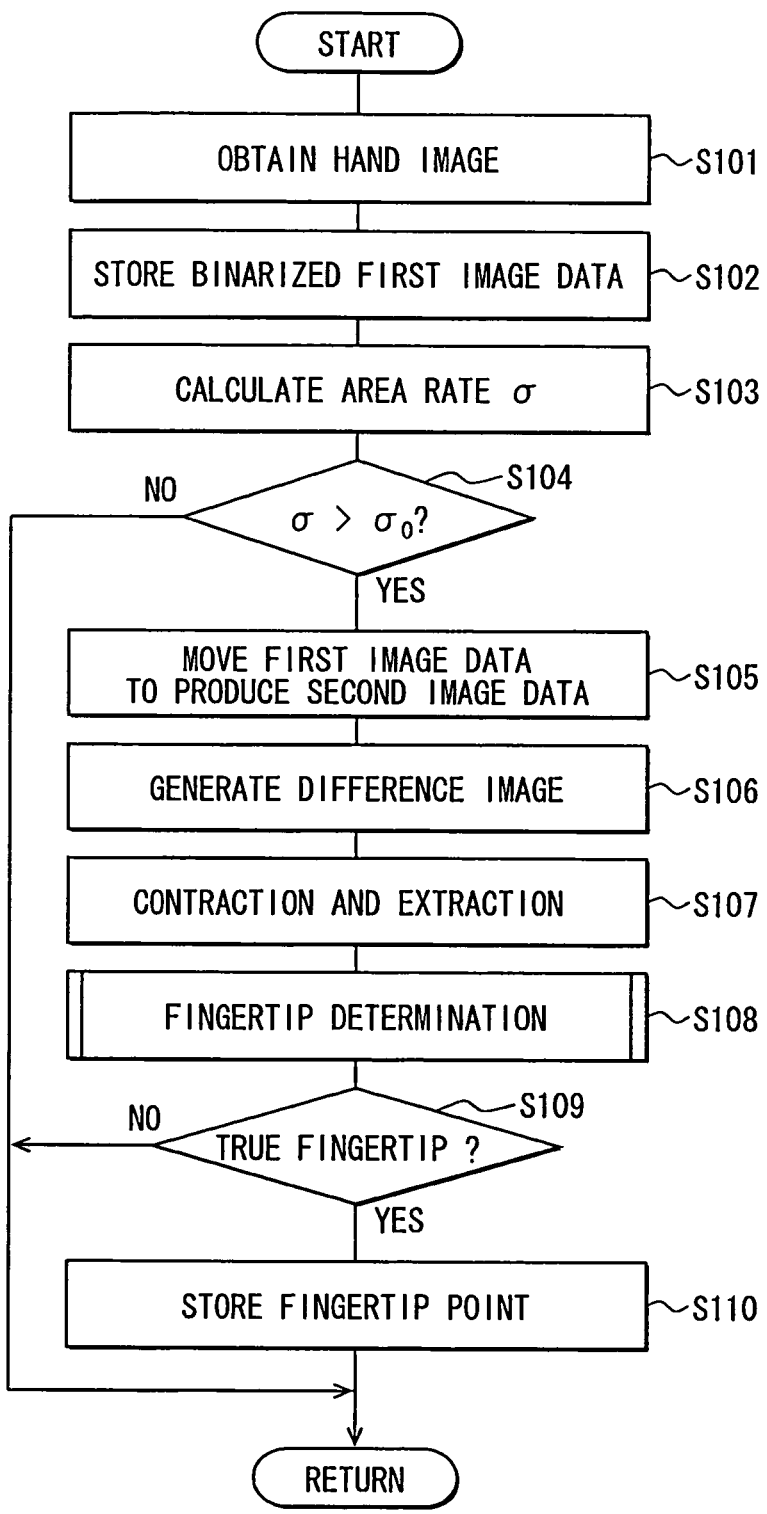
FIG. 5 is a flow chart showing an imaged fingertip point specifying operation.

FIG. 5 shows a fingertip point specifying operation repeatedly executed at a constant cycle. In the above-described state, as shown in FIG. 2, when the hand H is moved close to the input surface 102b of the touch panel 12a, the hand imaging camera 12b obtains an image of the hand according to the reflected light of the hand caused by the illumination light emitted from the illumination light source 12c. At S101 of FIG. 5, the photographic image (hand image) of the hand H is obtained. A pixel corresponding to the hand image appears lighter than a pixel corresponding to the background region due to a reflected light. The luminosity of a pixel of the hand image and the luminosity of a pixel of the background region are compared with a suitable threshold and binarized. Thus, as shown in the image A of FIG. 4, image separation can be carried out to generate an image object region (black region in the image A) showing a high-intensity pixel value of 1 and a background region (white region in the image A) showing a low-intensity pixel value of 0. At S102, the presently binarized image data is stored as first image data A.

At S103, an area rate σ of the image object region in the first image data A is calculated. When an image object does not exist in the imaging area of the hand imaging camera 12b, the area rate σ of the image object region becomes less than or equal to a predetermined threshold σ0. In this case, the subsequent operations are skipped. Subsequently, at S105 of FIG. 5, as shown by the image B of FIG. 4, image data produced by moving the first image data A by a predetermined length in a palm direction of the hand image is obtained as a second image data B. Specifically, the predetermined length is, for example, 20% to 80% (actual length of about 5 to 20 mm) of the length of the fingertip portion in the direction Y, wherein the fingertip portion is from the first joint of the middle finger. At S106, as shown by the image C of FIG. 4, a non-overlap region, which appears in the fingertip side when superimposing the image data one another, is specified as a tip end region (fingertip region) to in the insertion direction of the hand. The obtained original image data is moved in the lengthwise direction of the palm image and overlapped, and thereby the fingertip region can be easily specified as a non-overlap region. Even when two or more fingers are close to each other and tightly in contact with each other, the fingertip regions, which are in round shapes, can be clearly and separately specified.

The second image data B is generated by retreating the first image data A toward the wrist in the palm direction (Y direction). In the image C of FIG. 4, the non-overlap region, which appears on the side of the fingertip of the hand image of the first image-data A, is specified as the tip end region (fingertip region). The coordinates correspondence with the imaging area, which corresponds to the screen area of the monitor device 15, is stored in the first image-data A. In the above-described manner, the fingertip region can be specified in the first image-data A. Thus, a below-mentioned specifying operation for the fingertip point, which corresponds to a coordinates correspondence point on the screen area, can be performed in a simple manner. Each of the first and second image data is binarized. Therefore, the non-overlap region can be specified by calculating the difference between the first image data and the second image data. In this manner, the operation to specify the pixel of the non-overlap region is performed by executing a logical operation between the pixels of the first and second image data. Specifically, when the exclusive OR (XOR) between the pixels of the first and second image data is 0, the pixels can be specified as a non-overlap region. The non-overlap region between the first and second image data may include thin portions around lateral sides of a finger. In order to reduce such thin portions, it may be determined whether the XOR-operated pixels of the value "1" continually exist for a predetermined number or less. Further, the determined continuous pixels may be inverted to "0". Thus, such thin portions may be reduced.

Subsequently, at S107 of FIG. 5, a contraction operation (all directions) shown in the image D of FIG. 4 is applied to each fingertip region extracted in the above-described manner. Specifically, it is determined whether pixels around one pixel (noted pixel) of the value "1" include at least one pixel of the value "0". When a positive determination is given, the noted pixel is inverted to "0". More specifically, 4 pixels including the upper and lower two pixels and the left and right two pixels of the one noted pixels may be the determined object. Alternatively, all eight pixels surrounding the one noted pixel may be the determined object. The present processing is performed to all the noted pixels of 1. The present processing may be repeatedly performed for two or more times, as needed.

Figure 8:
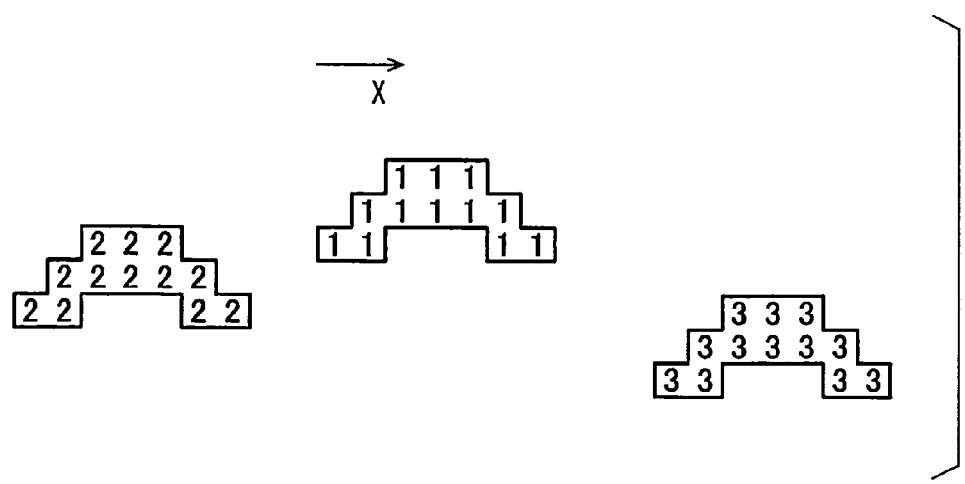
FIG. 8 is an explanatory view showing a concept of a labeling operation for separating multiple tip end regions from each other.

Subsequent to the contraction operation, a separating operation is performed to separate the tip end regions in the image data. Specifically, as shown in FIG. 8, the image is scanned in a predetermined direction such as the x direction, and it is determined whether interval pixels between pixels of the value "1" continually exist for a predetermined number such as 3 or more. According to the determination result, it is determined that the pixels of the value "1" constitute the same tip end region or a separate tip end region. Thus, each separate tip end region is assigned with a labeling numeral such as 1, 2, 3. From the second scanning row, when it is detected that a detection state of a pixel of "0" changes to a detection state of a pixel of "1", a labeling state of surrounding pixels such as eight pixels surrounding the detected pixel of "1" is determined. When an already assigned labeling numeral such as "2" is detected in the surrounding pixels, the labeling numeral such as "2" same as the already assigned labeling numeral is assigned to the detected pixel. Alternatively, when no labeling numeral is detected in the surrounding pixels, a new labeling numeral such as "3" is assigned. In this manner, aggregations of pixels, to which different labeling numerals are assigned, are recognized as different tip end regions.

Figure 7:
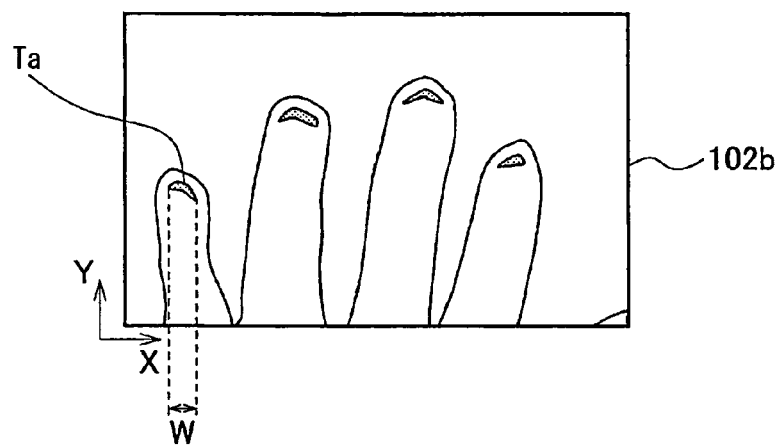
FIG. 7 is an explanatory view showing a concept of the width of a tip end region.

Subsequently, at S108, a fingertip determination operation is performed. Specifically, it is determined whether each of the separated and specified tip end regions is a true fingertip region. As shown in FIG. 7, the true fingertip region is determined on the basis of determination whether the size (width) L of the specified tip end region to in the finger width direction is in a stipulated range between an upper limit Wth1 and a lower limit Wth2. The stipulated range is predetermined on the basis of the width of a finger of a common adult. Referring to FIGS. 1, 2A, an occupant inserts a palm beyond a rear periphery of the imaging area 102b toward the input operation surface 102a of the touch panel 12a, i.e., the imaging area 102b of hand imaging camera 12b, while looking at the monitor device (display device) 15 located in the instrument panel. The input operation surface 102a of the center console C is located on the rear side of the monitor device 15 in the lengthwise direction of the vehicle. The input operation surface 102a is located on the front side of a seated occupant in the lengthwise direction of the vehicle. The imaging area 102b of the hand imaging camera 12b is for obtaining an image of a hand of the occupant, which is located on the operation input surface 102a, from the lower side. Therefore, the insertion direction of the hand is assumed to be in parallel with the Y-direction, which is perpendicular to the long side of the imaging area 102b in a horizontally long rectangular shape. The finger width direction is assumed to be in parallel with the X-direction, which coincides with the long side of the imaging area 102b. That is, the finger width direction is assumed to be perpendicular to the insertion direction of the hand when inserted toward the operation input surface 102a. In short, the width of the tip end region ta is fixedly measured in the X-direction, i.e., in the direction of the long side of the imaging area 102b.

Figure 6:
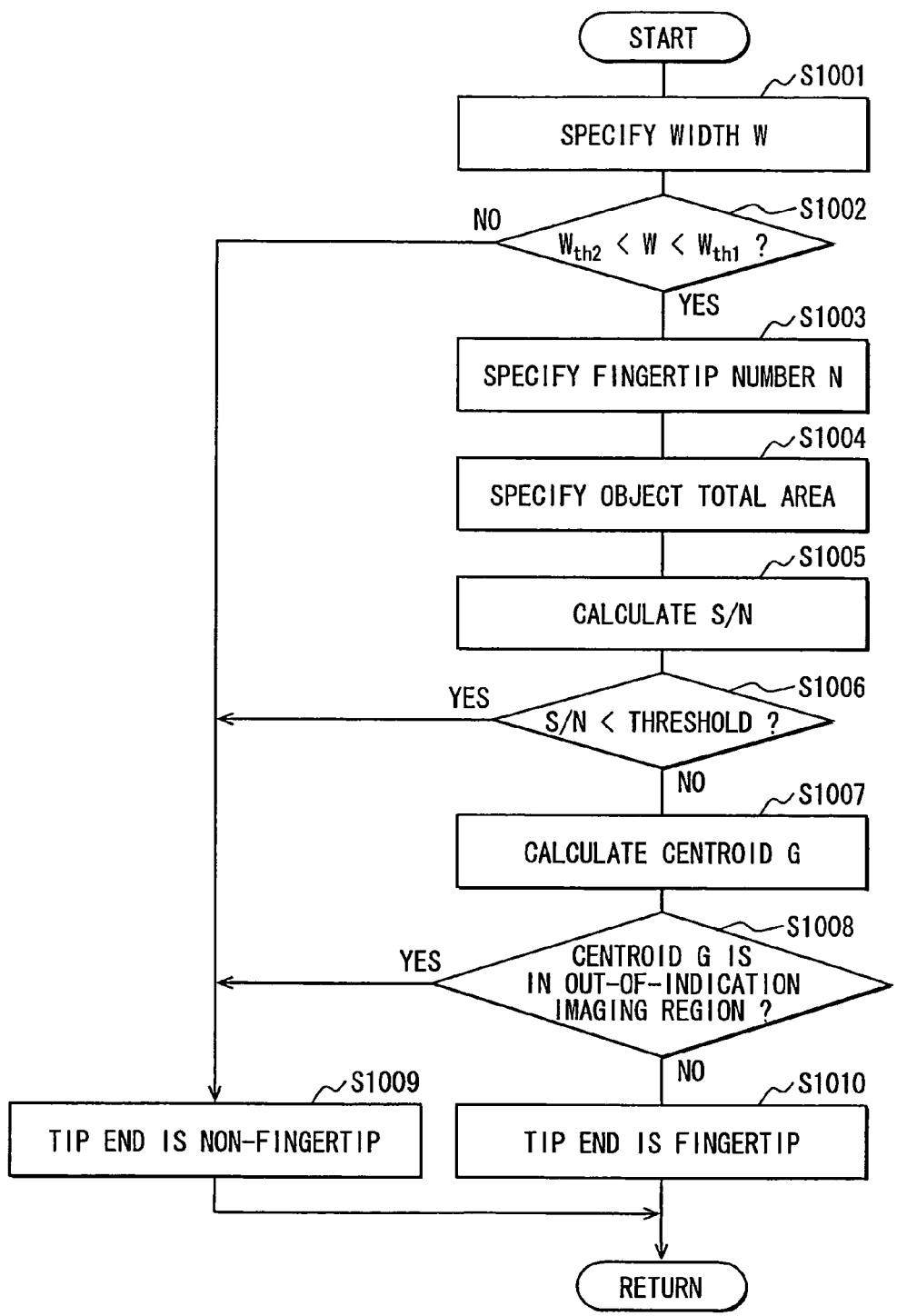
FIG. 6 is a flow chart showing a fingertip determination operation.

FIG. 6 is a flow chart showing a detailed one example of the fingertip determination operation. At S1001, the width W of each of the tip end regions ta, which are separated and specified, is obtained. Specifically, the width W of each of the tip end regions ta can be calculated by obtaining the maximum value Xmax and the minimum value Xmin of an X coordinate of each pixel constituting the tip end region ta and calculating the formula of W=Xmax−Xmin. At S1002, it is determined whether the width W of the tip end region ta specified in the above-described manner is in the above-described range between the upper limit Wth1 and the lower limit Wth2. The touch panel 12a is located on the center console C. It is noted that when an occupant such as a driver and a passenger is seated on the side of the center console C, the occupant often uses the center console C as a pedestal for a baggage. In the present condition, when such a baggage other than a hand is placed on the operation input surface 102a, i.e., the imaging area 102b of the touch panel 12a, an image of the baggage is photographed, instead of a hand of the occupant. According to the present embodiment, the photographed image is determined based on the width W of the tip end region ta, which is extracted from the difference between the obtained first image and the second image. The second image is obtained when the palm (hand) is moved in the Y-direction. Therefore, when a baggage such as a document or a book is placed on the center console C, the extracted and specified width of the tip end region is significantly greater than the upper limit of the range predetermined on the basis of the width of a finger of a common adult. Therefore, such a baggage can be steadily determined as a non-fingertip region. Alternatively, a cellular phone may be placed on the center console C. In this case, for example, an antenna portion protruding from the cellular phone may be imaged as the first tip end region. It is noted that, the width of such an antenna is significantly less than the width of a finger. Therefore, the width of the imaged first tip end region of such an antenna is much less than the lower limit of the range predetermined on the basis of the width of a finger. Thus, such a cellular phone can be properly determined as the non-fingertip region. At S1003, the number N of the fingertip region is specified. At S1004, the total area of the imaged object is specified.

In another case, for example, one finger or two fingers, such as one or two of an index finger, an index finger, and the middle finger, may be extended, and remaining finger(s) may be bent, when an image of the hand is actually obtained. Alternatively, a grasped first may be imaged when an image of the hand is actually obtained. In these cases, the width of the tip end region of the bent or grasped finger(s) may be greater than the upper limit of the predetermined range, and the width of an extended finger(s) may be within the predetermined range. Therefore, in a condition where multiple tip end regions are extracted, when the width of at least one of the multiple tip end regions is within the predetermined range, the at least one tip end region may be determined to be a true fingertip region.

Alternatively, it is conceived that an object, which is in a shape to have the width W within the predetermined range, may be placed on the input surface 102b of the touch panel 12a. In this case, such an object may be possibly recognized to be a true fingertip region erroneously, even though the object is supposed to be a non-fingertip region, For example, a coin may be placed on the input surface 102b. In this case, since the size of the coin is close to the finger width, the width of the determined tip end region caused by the coin and obtained by the contraction operation may be within the predetermined range. Consequently, in this case, the coin may be erroneously determined to be a fingertip region. Here, the difference between an image of a finger and an image of a coin will be described. A finger has a lengthened imaging region including a portion near a finger base and extending to reach a rear end periphery of the imaging area on the side of the inserted palm. On the contrary, a coin has a circular imaging region isolated from the rear end periphery of the imaging area on the side of the inserted palm. In the case of a coin, a background region ("0" pixel region) is caused in the area between the rear end of the circular region of the coin and the rear end periphery of the imaging area on the side of the inserted palm. Therefore, an index value of S/d may be used for determining whether the obtained image is a finger or another object such as a coin, wherein S is a total area of a photographic image, and d is a total distance of the non-overlap region to the rear end periphery of the imaging area. Thus, the above-described erroneous determination can be effectively avoidable by making a determination in accordance with the index value S/d. Specifically, in the case of an object such as a coin, the background region exists on the side of the rear end periphery of the imaging area. Therefore, the total area S is small. Therefore, when the index value S/d is less than the lower limit of the predetermined range, the imaged object may be determined to be a non-fingertip region and may be excluded from the fingertip region. Alternatively, the finger width may be estimated on the basis of the index value S/d. In this case, when the estimated finger width is less than the lower limit of the predetermined range, the imaged object may be determined to be a non-fingertip region and may be excluded from the fingertip region. In the flow chart of FIG. 6, the above-described determination is made at S1005 and S1006.

Subsequently, at S1007 of FIG. 6, a representative point is determined about the tip end region ta, which is not excluded at S1002 and S1006. In the present embodiment, a geometric centroid position G of the tip end region ta is used as the representative point. The coordinates of the centroid position G may be calculated by using a generally known arithmetic method. Specifically, for example, a total value of the X-direction coordinates of all the pixels constituting the tip end region and a total value of the Y-direction coordinates of all the pixels constituting the tip end region are calculated. Subsequently, the total value of the X-direction coordinates is divided by the number of the pixels, and the total value of the Y-direction coordinates is divided by the number of the pixels so as to calculate the coordinates of the centroid position G. Alternatively, for example, a pixel at the largest Y-coordinate value may be employed as the representative point, instead of the centroid position G.

It is noted that, a finger pad of a finger actually makes contact with the input surface 102b of the touch panel. That is, a middle portion of a finger at a lower side of the fingertip in the Y-direction actually makes contact with the input surface 102b. Therefore, in the image F of FIG. 4, the centroid position calculated in the image E is moved, i.e., offset to the lower side in the Y-direction by a predetermined length, and the offset position is determined as an image fingertip point G. Alternatively, the centroid position determined in the image E may be used as the image fingertip point G. In this case, the operation shown by the image F may be omitted. When the hand is in a specific physical relationship relative to the imaging area 102b, the representative point determined by the algorithm according to the difference between images may not coincide with the true fingertip point. Specifically, when a fingertip portion is out of an imaging area, the determined representative point may not coincide with the true fingertip point. Here, it is supposed that the correspondence coordinate range of the imaging area 102b coincides with those of the input surface 102b of the touch panel and the screen of the monitor device 15. In this case, a true fingertip position may be within the periphery of the imaging area (input surface) 102b, i.e., the screen of the monitor device 15. Alternatively, a true fingertip portion may be out of the imaging area 102b. In this case, the image of the fingertip portion breaks off, i.e., only an image of a middle part of the finger is obtained. In any of the above cases, the tip end region specified according to the difference between images is within the periphery of the imaging area 102b. Even when the fingertip portion is out of the imaging area 102b, an image of a part of a finger is obtained. In this case, the width of the obtained image is possibility within the predetermined range. Therefore, the tip end region obtained in the periphery of the imaging area 102b may be erroneously recognized as a true fingertip region.

Figure 14:
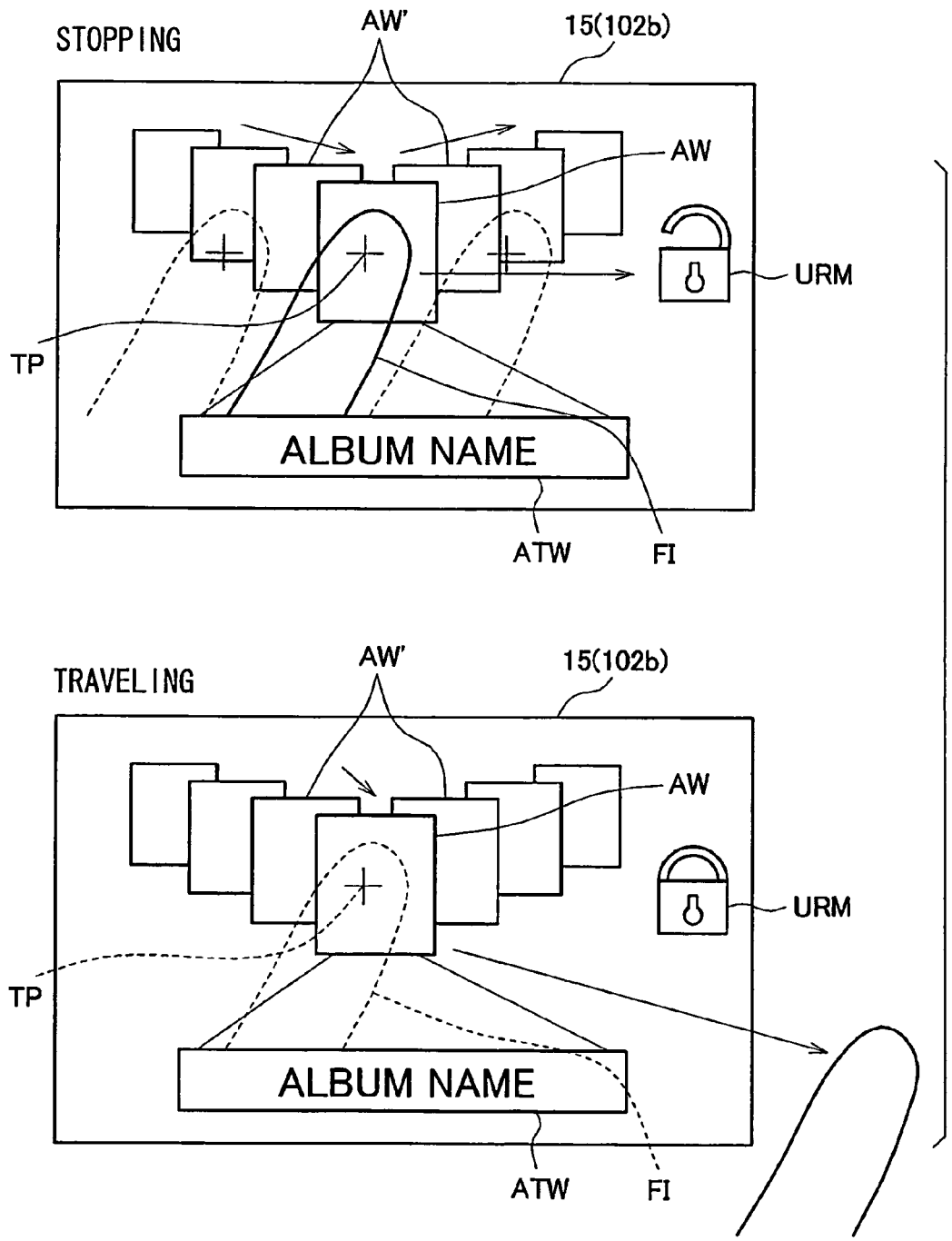
FIG. 14 is a view showing a fourth example of the interface specification data according to the first embodiment.

In view of the present problem, in the present embodiment, a peripheral region of an effective coordinate range of the imaging area 102b is assigned as an out-of-indication imaging region. An indication area corresponding to the out-of-indication imaging region is out of the effective coordinate range of the screen of the monitor device 15. A tip end of a finger portion, which extends to the outside of the screen, causes an image object region in the out-of-indication imaging region. Therefore, the tip end region specified based on the difference between images and the imaged fingertip point specified by the representative point of the tip end region are caused in the out-of-indication imaging region. On the other hand, as shown in FIG. 13B, when a true fingertip does not enter the out-of-indication imaging region and remains in the periphery of the screen, the tip end region and the imaged fingertip point are caused in the screen. Therefore, when the tip end region ta exists in the out-of-indication imaging region 102e, the tip end region ta is determined to be invalid, and the tip end region ta is not recognized as a true fingertip. Alternatively, when the tip end region ta does not exist in the out-of-indication imaging region 102e, the tip end region ta is determined to be effective, and the tip end region ta is recognized as a true fingertip. For example, as shown in FIG. 14, when multiple imaged fingertip points tp are specified, it is determined whether the multiple imaged fingertip points tp exists in the out-of-indication imaging region 102e one by one. Thus, the determination whether the imaged fingertip point tp is effective or invalid is individually performed for each of the multiple imaged fingertip points tp. In the flow chart of FIG. 6, the above-described determination is made at S1008 to S1010. The rear end of the display screen on an insertion side, from which a hand is inserted in the Y-direction, may coincide with the rear end of the imaging area 102b. In this case, the out-of-indication imaging region 102e may not be assigned to the rear end of the display screen in the Y-direction.

The algorithm for determining whether the tip end region ta is a true fingertip region may employ various other methods. For example, the length of the fingertip portion in the direction Y in the first image for obtaining the second image may be set to a smaller value than a width of a finger of a common adult. In this case, the tip end region ta obtained as the difference between the first image and the second image is apt to be a horizontally long region. Specifically, the X-direction size $W_X$ (width) of the horizontally long region is apt to be greater than the Y-direction size $W_Y$ (length) of the horizontally long region. In the present case, it can be determined whether the tip end region ta is a true fingertip region based on determination whether an X/Y aspect ratio $\phi$ ($=WX/WY$) of the tip end region ta is in a predetermined range. For example, when a paper or a document is placed on the input surface 102b, the aspect ratio $\phi$ becomes extraordinary large. Alternatively, when an antenna of a cellular phone, which is thinner than a finger, is placed on the input surface 102b, the aspect ratio $\phi$ becomes a smaller value by a shortage of the X-direction size $W_X$ (width). In either case, such a paper or a document and an antenna of a cellular phone can be excluded from the non-fingertip region.

In consideration of a case where a finger inclined relative to the Y-direction is inserted, various pairs of parallel lines, which are circumscribed to the tip end region ta, may be generated, while the inclined angle is changed. Thus, the aspect ratio $\phi$ may be calculated by the equation of Wmax/Wmin, wherein Wmax is a maximum parallel-lines distance, which is the maximum distance between the parallel lines, and Wmin is a minimum parallel-lines distance, which is the minimum distance between the parallel lines.

Alternatively, a value of S/N may be estimated as an average finger area, wherein S is the total area of the image object region ("1" pixel region) of the photographic image, and N is the number of the specified tip end regions (non-overlap regions) ta. In this case, it may be determined whether the tip end region ta is a true fingertip region based on determination whether the S/N is in a predetermined range. The present method may be effective when, in particular, the size of the image region in the Y-direction is set to encompass only a part of a hand on the side of the fingertip, and an image object region mainly include the finger region when an image of the hand is obtained.

Referring to FIG. 5, when the fingertip determination operation of S108 is completed, the processing proceeds to S109. At S109, it is determined whether the specified tip end region is a true fingertip region for each of the specified tip end regions. At S110, centroid coordinates G of the representative point of only the true fingertip region is stored as a true imaged fingertip point. Specified fingertip regions excluded from the true fingertip region is discarded or invalidated.

As follows, various embodiments of a user interface engine 103e will be described. As shown in FIG. 3, the operation ECU 10 obtains vehicle speed information; which is detected by the vehicle speed sensor 301, from the body ECU 300 via the serial communication bus 30. The operation ECU 10 determines the present state to be a low-speed traveling state or a stopping state when the obtained vehicle speed information indicates that the vehicle speed is less than or equal to a threshold such as 1 to 10 km/hr (5 km/hr as one example). Alternatively, the operation ECU 10 determines the present state to be a high-speed traveling state (traveling state) when the obtained vehicle speed information indicates that the vehicle speed is greater than the threshold. The user interface engine 103e has interface specification data including low-speed traveling interface specification data (stopping interface specification data) used when the vehicle stops and high-speed traveling interface specification data (traveling interface specification data) used when the vehicle is traveling. When the vehicle stops, the interface specification data is switched to the stopping interface specification data. When the vehicle is traveling, the interface specification data is switched to the traveling interface specification data.

Figure 11:
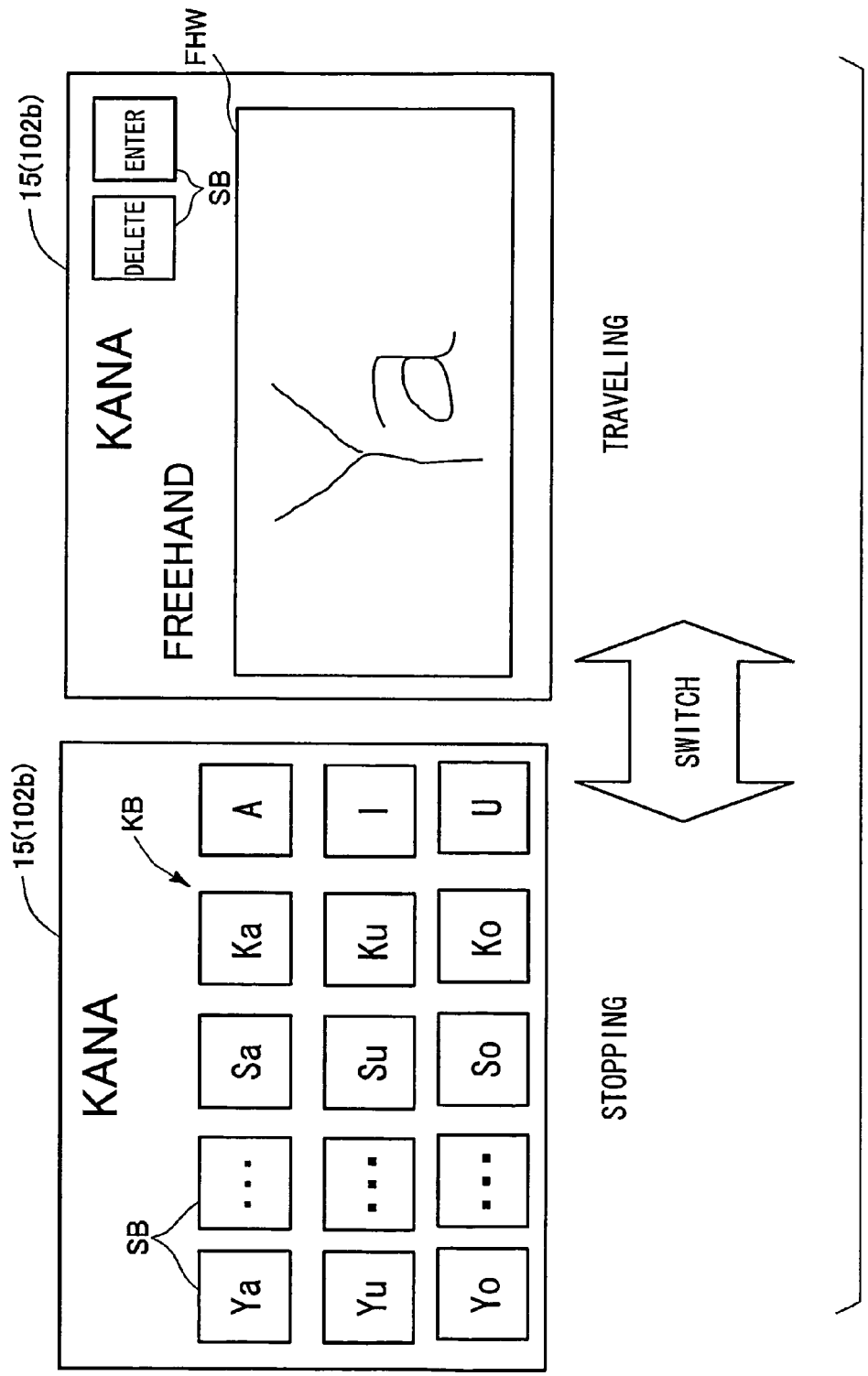
FIG. 11 is a view showing a first example of the interface specification data according to a first embodiment.

FIG. 11 shows a first example of the interface specification data according to a first embodiment. Specifically, the left drawing of FIG. 11 shows a stopping interface specification including a formation and indication number of effective operation regions SB. The right drawing of FIG. 11 shows a traveling interface specification including a formation and indication number of effective operation regions SB, FHW. The formation and indication number of the right drawing of the FIG. 11 is set to be less than the formation and indication number of the left drawing of FIG. 11. In FIG. 11, the first example of the interface specification data is applied to a character input screen of a car navigation system for inputting characters to specify a destination, a route to the destination, and the like.

In the stopping interface specification, the operation regions are individual character input soft button SB constituting a character input keyboard KB. The image fingertip point is positioned at a soft button of a preferred character, and a touch operation is performed in a position corresponding to the preferred character on the touch panel 12a. That is, the touch operation is performed to cause an inputted touch point in a region of the soft button. Thereby, a corresponding character is inputted, and a code corresponding to the inputted character is outputted as operation instruction information to the car navigation system.

On the other hand, in the traveling interface specification, a keyboard is not indicated, and a free hand input window FHW for inputting a character by hand writing is indicated as an operation region. The free hand input window FHW is formed to be larger than the character input soft button SB in the stopping interface specification. For example, the free hand input window FHW is formed substantially in a similar size as the character input keyboard KB. A temporal change in either of the inputted touch point or the image fingertip point is captured as a drawing locus. Further, the drawing locus is compared with each character shape on a character list. A code of a character, which matches with the drawing locus, is outputted as operation instruction information to the car navigation system. The indicated and formed soft buttons SB in the traveling interface specification only include a delete button and an enter button. The delete button is used for deleting a history of a hand-written character in the course of input by free hand writing. The enter button is used for entering (confirming) the content of the inputted character by free hand writing.

Figure 12:
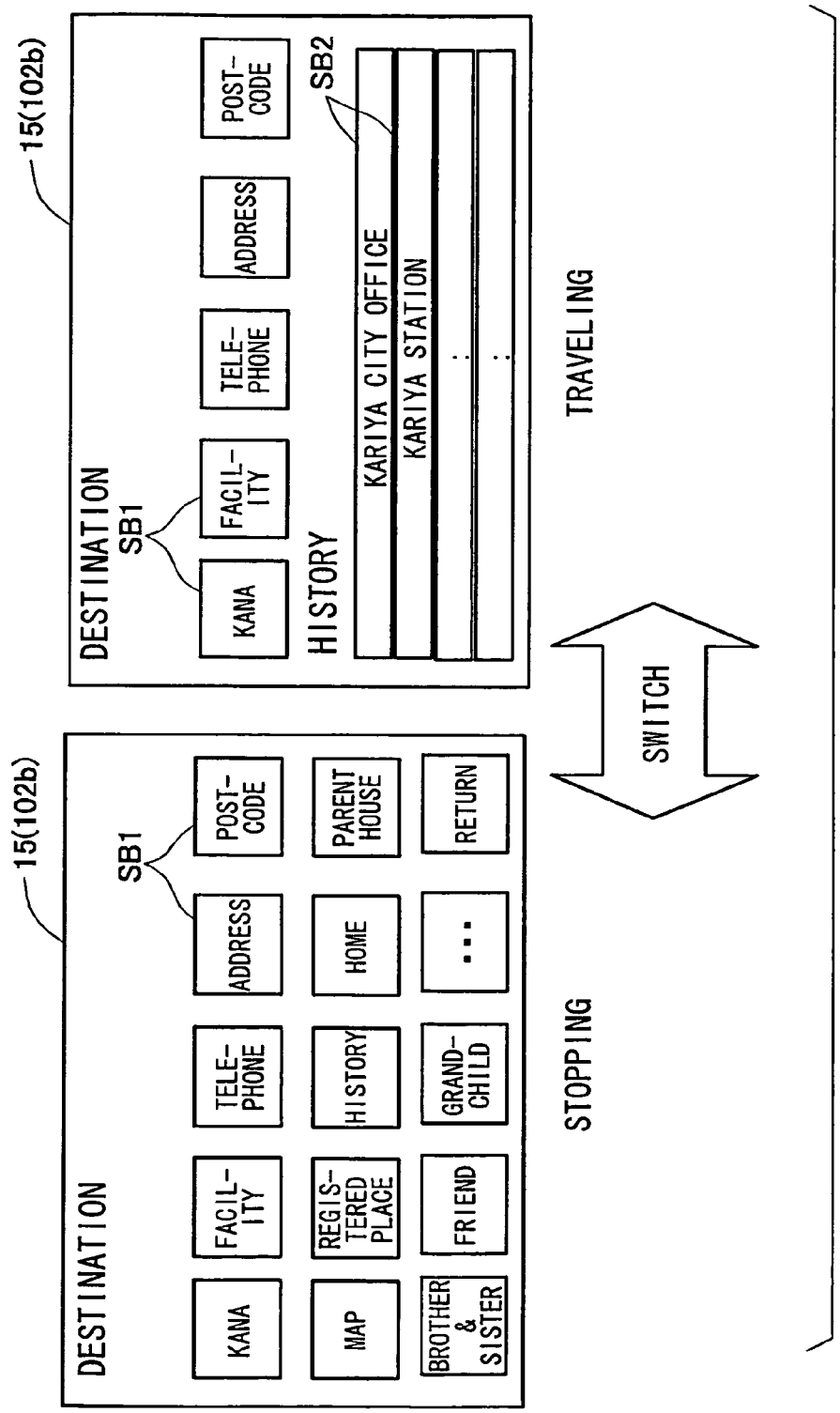
FIG. 12 is a view showing a second example of the interface specification data according to the first embodiment.

FIG. 12 shows a second example of the interface specification data according to the first embodiment. Specifically, the left drawing of the FIG. 12 shows a stopping interface specification including an effective operation region in a formation and indication size. The right drawing of FIG. 12 shows a traveling interface specification including an effective operation region in a formation and indication size. The formation and indication size of an effective operation region in the right drawing of FIG. 12 is set to be larger than the formation and indication size of an effective operation region in the left drawing of FIG. 12. In FIG. 12, the second example of the interface specification data is applied to a menu screen for setting a destination in a car navigation system.

In the stopping interface specification, the operation region includes individual menu buttons SB1. Similarly to the first embodiment, the image fingertip point is positioned at a soft button of a preferred menu, and a touch operation is performed in a position corresponding to the preferred menu on the touch panel 12a. That is, the touch operation is performed to cause an inputted touch point in a region of the soft button. Thereby, a corresponding menu is selected, and the content of the selected menu is outputted and transmitted as operation instruction information to the car navigation system.

On the other hand, in the traveling interface specification, the number of the menu buttons SB1 is reduced, and a sub-menu button SB2 is indicated. The sub-menu buttons SB2 are at a lower rank than a specific menu in a hierarchical menu. Each of the sub-menu button SB2 is formed and indicated to be rectangular and larger in the horizontal direction than the menu button SB1 in the stopping interface specification. In FIG. 12B, the sub-menu buttons SB2 is a potential destination as one example, and the specific menu is a destination history as one example. Similarly to the first embodiment, the image fingertip point is positioned at a soft button of a preferred menu, and a touch operation is performed in a position corresponding to the preferred menu on the touch panel 12a. That is, the touch operation is performed to cause an inputted touch point in a region of the soft button. Thereby, a corresponding menu is selected, and the content of the selected menu is outputted and transmitted as operation instruction information to the car navigation system.

FIGS. 13A to 13E shows a third example of the interface specification data according to the first embodiment. In the present third example, specifically, as the number of the detected image fingertip points G increases, the number of classifications of operation regions formed and indicated on the operation panel increases. In addition, a maximum formation and indication classification number in the operation region in the traveling interface specification is set to be less than the maximum formation and indication classification number in the operation region in stopping interface specification. The third example of the interface specification data is applied to a car navigation system.

In the stopping interface specification, when the number of the detected image fingertip point G is one (not shown), a play and stop button P/S is indicated as the operation region in a position corresponding to the image fingertip point G. When the number of the detected image fingertip points G is two, as shown in FIG. 13B, a forward button FF and a rewind button RF are indicated in the positions corresponding to the image fingertip points G. Further, when the number of the detected image fingertip points G is three, as shown in FIG. 13A, the forward button FF, the play and stop button P/S, and the rewind button RF are indicated in the positions corresponding to the image fingertip points G. In either case, a touch operation is performed on a button indicated on the touch panel 12a by at least one finger to select a function corresponding to the touched button. Thus, a content of the selected function is outputted as operation instruction information. In this case, the maximum formation and indication classification number of the operation regions is three when the number of the detected image fingertip points G is three.

On the other hand, in the traveling interface specification, the effective operation region is set to only the play and stop button P/S, irrespective of the number of the detected image fingertip points G. That is, the maximum formation and indication classification number is one. In FIG. 13C, the number of the detected image fingertip points G is three. However, only the one element of the play and stop button P/S is formed and indicated as the operation region in the position away from the image fingertip point G. In the case of FIG. 13D, the play and stop buttons P/S are indicated correspondingly to the image fingertip points G by the number of the image fingertip points G. In this case, the multiple operation regions are indicated correspondingly to the image fingertip points G. However, it is noted that the number of the classification of the operation regions is still one. In either case, the instruction object images FI are respectively indicated on the image fingertip points G. In the case of FIG. 13E, even when multiple image fingertip points G are detected, only one instruction object image FI is indicated. Corresponding to the one instruction object image FI, the only one operation region is also formed and indicated. In either case, only the play and stop button P/S is operated when a touch operation is performed by any finger.

FIG. 14 shows a fourth example of the interface specification data according to the first embodiment. The fourth example of the interface specification data is applied to a music selection screen of a car audio system for playing music items. The music items are contained as a played object in an audio file group. The audio file group has a hierarchical menu where multiple music contents (second hierarchical menu titles) are contained in each album (first hierarchical menu titles). A title image of a presently selected album is indicated on a present album window AW, which is an effective operation region on the screen. An album name corresponding to the presently selected album is outputted as selected album information (operation instruction). In the present example, reserve album window groups AW' are formed and indicated on the right and left sides of the present album window AW for showing albums arranged forward and backward of the presently selected album. The reserve album window groups AW' are partially overlap the present album window AW. An album name of the presently selected album is indicated on an album name window ATW.

In the present screen, a drag operation on the input surface 102b of the touch input device 12 is detected. In the present example, the drag operation is detected according to a temporal change in the inputted touch point TP. It is noted that the drag operation may be detected according to a change in the imaged fingertip point. When the drag operation is performed in the arrangement direction of the album window groups AW, AW', the title image of the present album window AW is successively switched to the title image of the album corresponding to the reserve album window group AW', and the switched title image is indicated. Simultaneously, the album name indicated on the album name window ATW is also successively switched. When the direction of the drag operation changes, the switching direction of the albums also changes.

In the stopping interface specification, as shown in the upper drawing of FIG. 14, the title image (operation region) of the album is successively switched when one drag operation is continued. A lock mark URM is indicated in the form of "unlocking" to indicate that the successive switching is enabled. On the other hand, in the traveling interface specification in the lower drawing of FIG. 14, only one title image (operation region) of an album is intermittently switched in response to one drag operation. In the present state, the lock mark URM is indicated in the form of "locking" to indicate that the successive switching is disabled.

FIG. 15 shows a fifth example of the interface specification data according to the first embodiment. In FIG. 15, when a touch operation is performed on the present album window AW, a music list window LW of the presently selected album is indicated. Each music name display area on the list forms a soft button for music selection. When a touch operation is performed to the music name display area, an operation instruction is outputted as music selection information. When a drag operation is performed on the music list window LW in the arrangement direction (vertical direction) of the music name display area, the music name display area is successively scrolled in the music list window LW in a direction correspondingly to the drag operation. In the stopping interface specification, as shown in the upper drawing of FIG. 15, the music name display area is scrolled such that the music name display area is continuously switched when one drag operation is continued. On the other hand, in the traveling interface specification, as shown in the lower drawing of FIG. 15, each time when a touch operation is performed, one presently selected music is moved in a direction indicated by one of the direction marks BA, which is located in the vicinity of the inputted touch point. Consequently, the presently played music is switched to the subsequent music specified by the corresponding direction mark BA, and the subsequent music is played.

Figure 16:
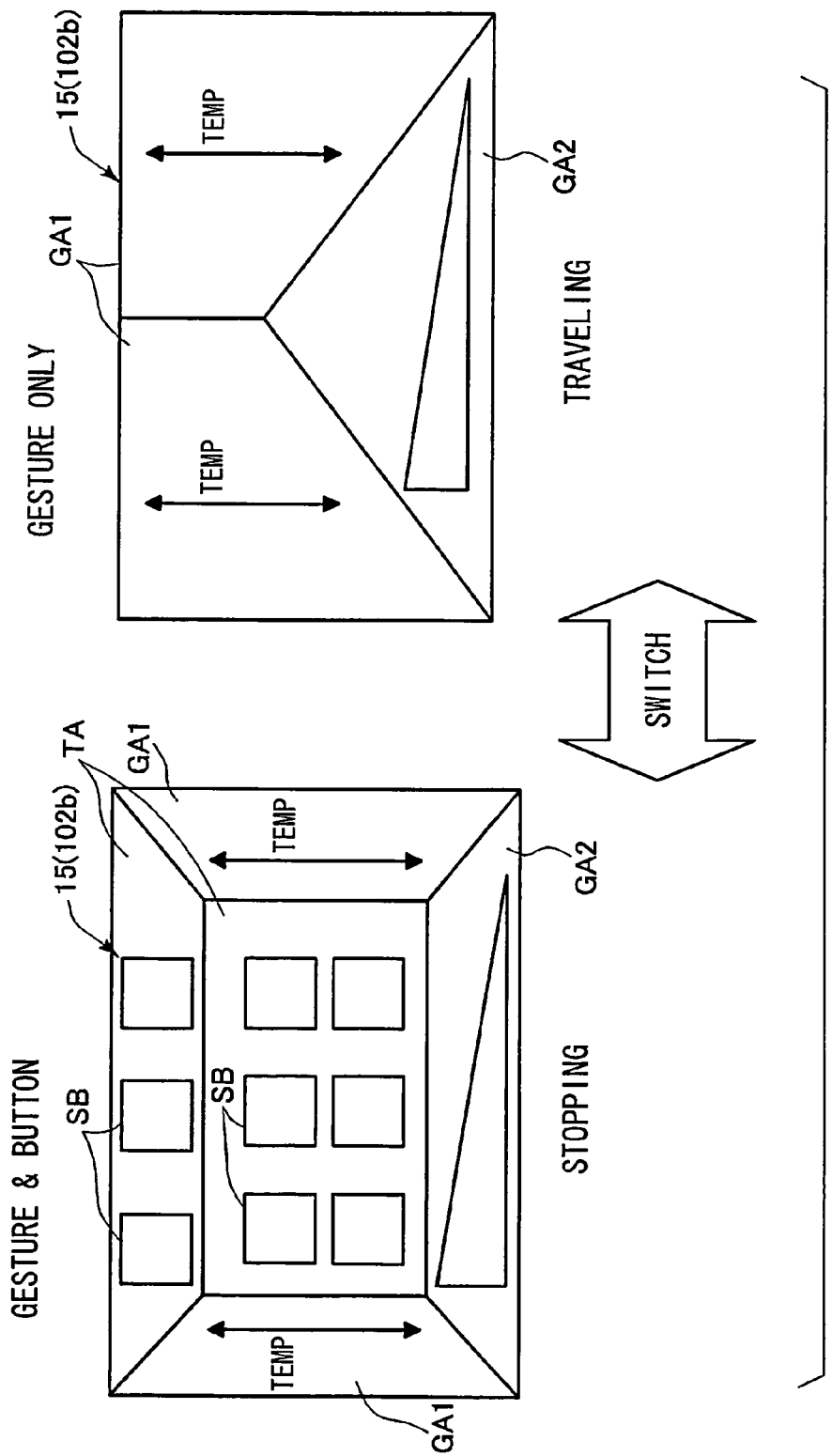
FIG. 16 is a view showing a sixth example of the interface specification data according to the first embodiment.

FIG. 16 shows a sixth example of the interface specification data according to the first embodiment. The sixth example of the interface specification data is applied to an airconditioner. The left drawing of FIG. 16 shows the stopping interface specification. In the left drawing of FIG. 16, mode switching buttons SB for performing various mode switching controls of the airconditioner are formed and indicated as multiple operation regions. When an inputted touch point is detected in one of the mode switching buttons SB, a switching signal corresponding to a mode of the detected mode switching buttons SB is outputted as second operation instruction information. In the screen, a switch operation region GA1 for instructing a set temperature and a switch operation region GA2 for instructing an amount of wind are formed. A drag operation (operation pattern: gesture) is performed to the switch operation regions GA1, GA2 in a specified direction in the regions. The set temperature and the amount of wind are gradually changed in the direction of the drag operation according to the inputted touch point and change in the position of the image fingertip point. Thus, information specifying the changed content by the drag operation is outputted as first operation instruction information. In this case, both the first operation instruction information and the second operation instruction information are activated. The right drawing of FIG. 16 shows the traveling interface specification. In the right drawing of FIG. 16, the mode switching button SB is omitted or disabled, and only the switching operation region GA1 for setting the temperature and the switching operation region GA2 for setting the amount of winds are formed. That is, only the first operation instruction information is activated.

Figure 17:
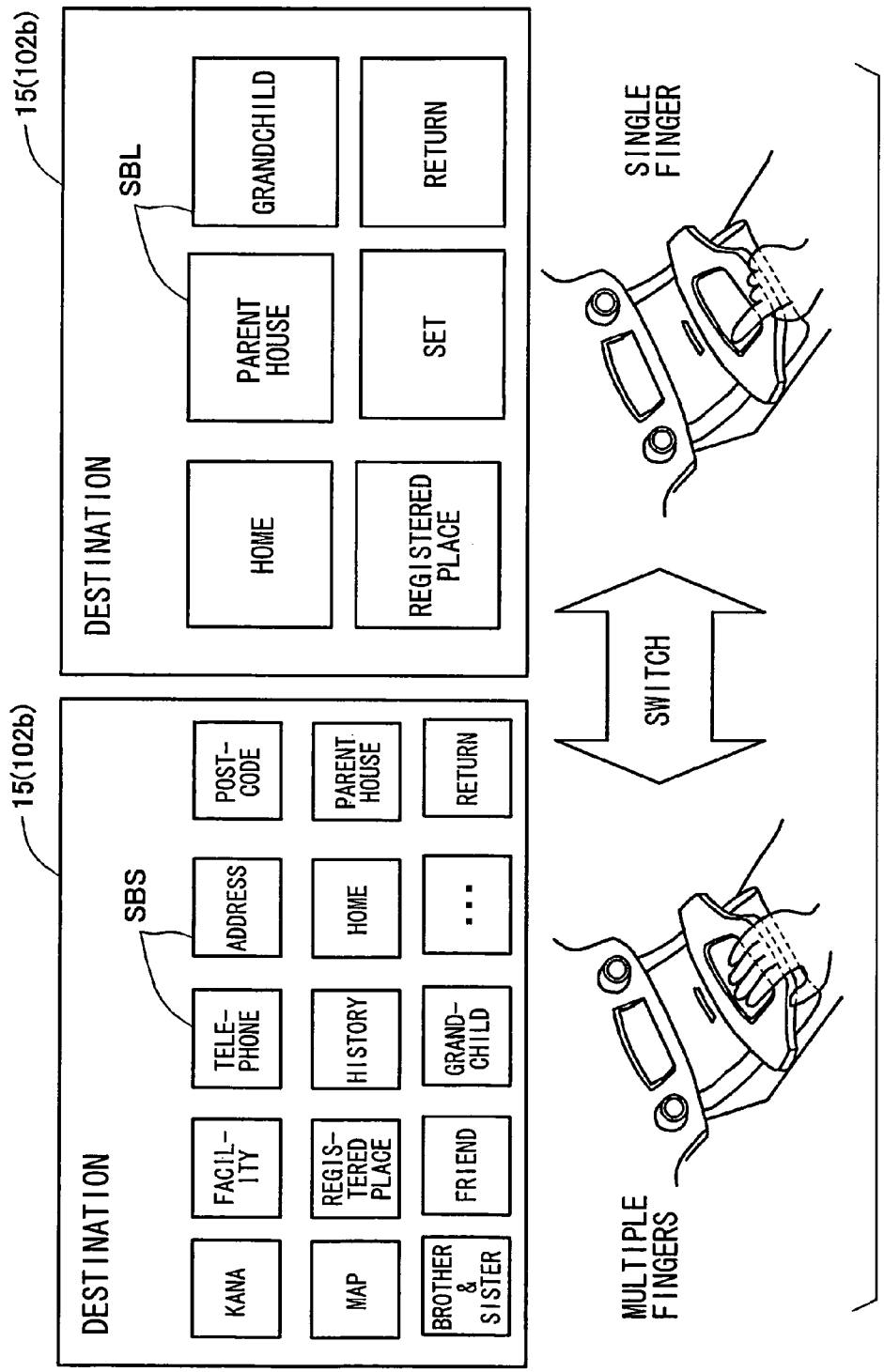
FIG. 17 is a view showing a first example of interface specification data according to a second embodiment.

FIG. 17 show a second embodiment of interface specification data. The interface specification data is applied to a menu screen for setting a destination in a car navigation system. The operation regions are individual menu buttons SBS, SBL. The image fingertip point is positioned at a soft button of a preferred menu, and a touch operation is performed on a position corresponding to the preferred menu on the touch panel 12a. Thereby, a corresponding menu is selected, and the content of the selected menu is outputted and transmitted as operation instruction information to the car navigation system. The left drawing of FIG. 17 shows an interface when multiple imaged fingertip points are simultaneously detected. The right drawing of FIG. 17B shows an interface when only one imaged fingertip point is detected. The formation and indication number of the menu buttons SBS when multiple imaged fingertip points are simultaneously detected is set to be greater than the formation and indication number of the menu buttons SBS when only one imaged fingertip point is detected. In the case of the right drawing of FIG. 17, as the formation and indication number of the menu buttons SB1 decreases, the formed size of each menu button SB1 is increased.

Figure 18:
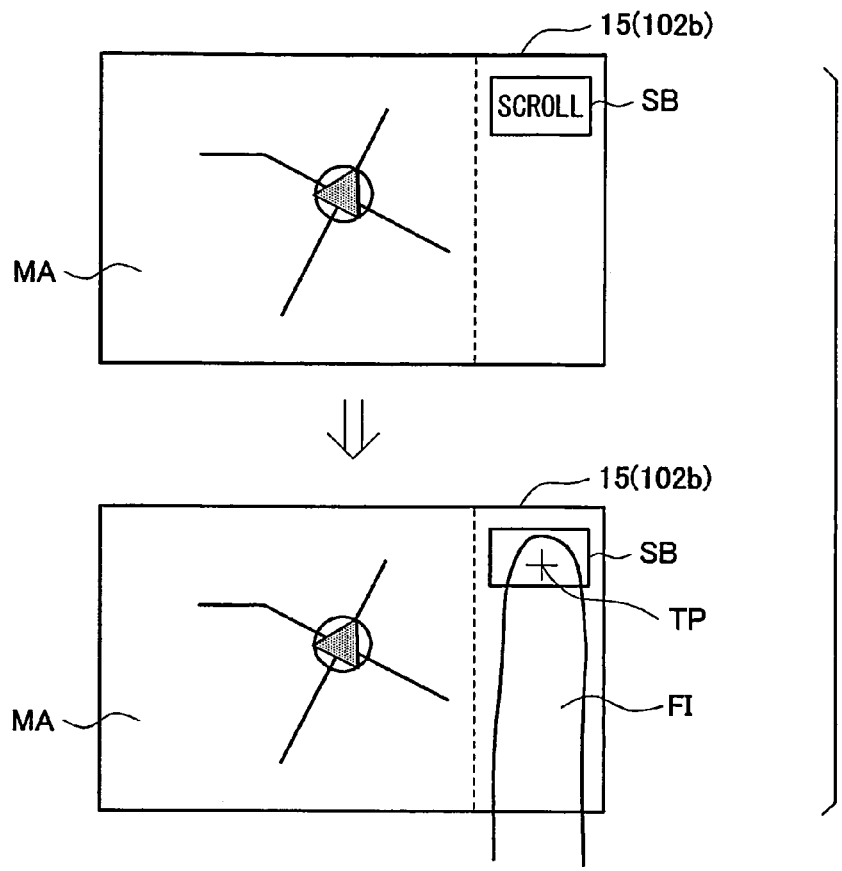
FIGS. 18 to 20 are views showing a first example of interface specification data according to a third embodiment.
Figure 19:
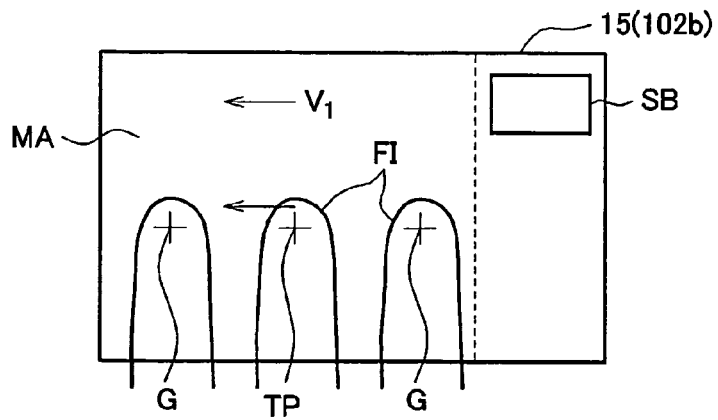
Figure 20:
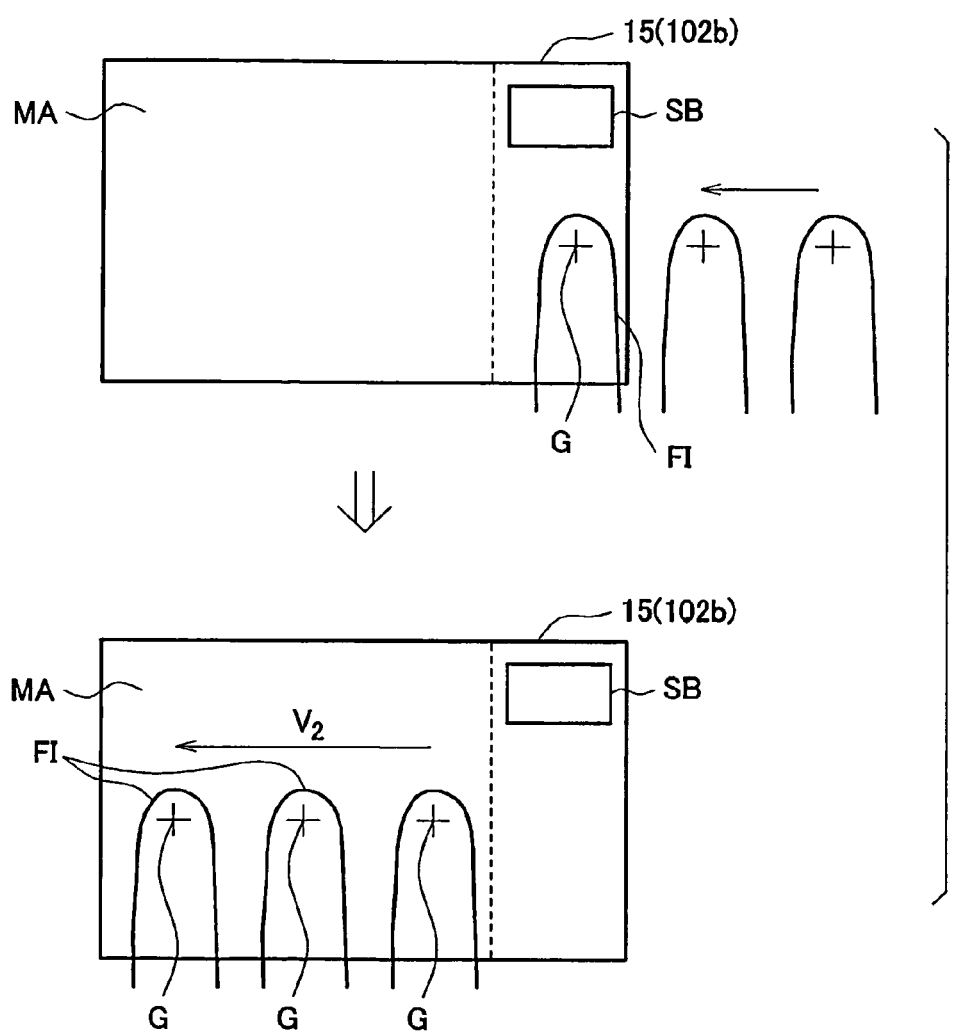

FIGS. 18 to 20 show a first example of interface specification data according to a third embodiment. When the imaged fingertip point is detected, the interface specification of the user interface engine 103e is changed according to determination whether a touch operation to the touch input device 12 is simultaneously detected. The interface specification is applied to a map display screen of a car navigation system. In the map display screen, a map indication region MA and a scroll button SB are formed. As shown in FIG. 18, a touch operation is performed to the scroll button SB, and thereby a scroll operation of the map in map indication region MA can be performed.

FIG. 19 shows an interface specification when a drag operation accompanied by a touch operation is performed with any one finger on the map indication region MA. In this case, a map is scrolled at a first speed V1 in the drag operation direction in the map indication region MA. On the other hand, FIG. 20 shows an interface specification when a drag operation is performed without a touch operation on the map indication region MA. That is, in this case, the drag operation is performed when only the imaged fingertip point G is specified. In consideration that the imaged fingertip points G of multiple fingers are detected, the drag operation can be detected by tracking the imaged fingertip point G, which is first detected, or by determining a temporal change in the detected number of the imaged fingertip points (0→1→2→3→2→1→1). In the present specification, the map is scrolled at a second speed V1, which is faster than the above-described first speed V1 in the drag operation direction in the map indication region MA.

Figure 21:
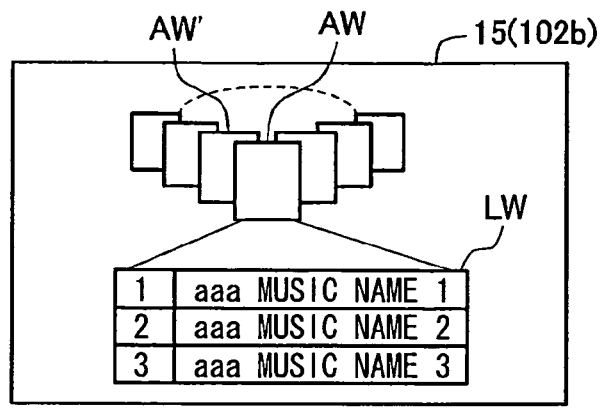
FIGS. 21 to 23 are views showing a second example of interface specification data according to the third embodiment.
Figure 22:
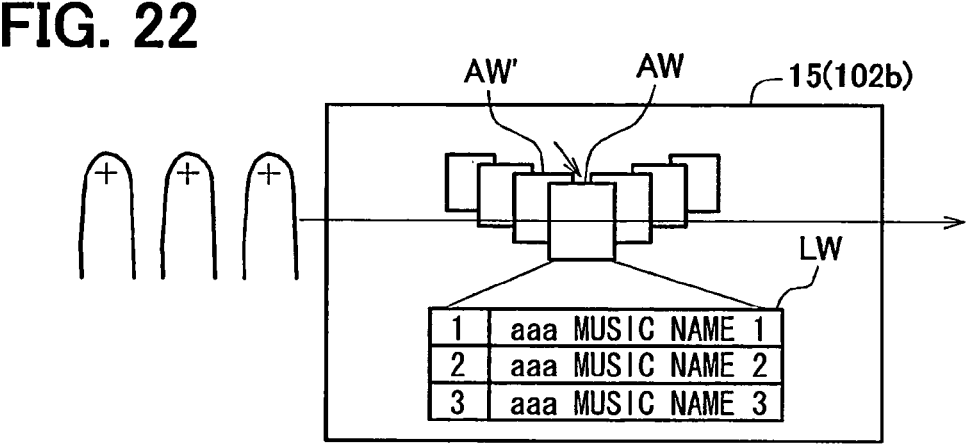
Figure 23:
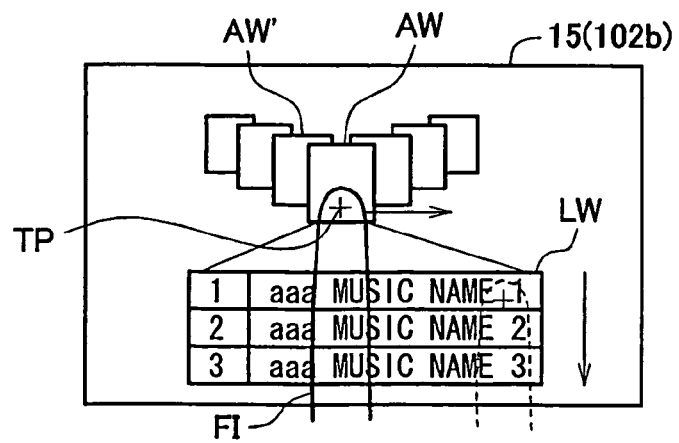

FIGS. 21 to 23 show a second example of interface specification data according to the third embodiment. The present specification is applied to a music selection screen of a car audio system similar to the examples of FIGS. 14, 15. As shown in FIG. 21, a present album window AW and a reserve album window groups AW' are formed and indicated similarly to the embodiment of FIG. 14. A music list window LW of an album is indicated on the lower side of the present album window AW. FIG. 22 shows an interface specification when a drag operation is performed without a touch operation on the map indication region MA. That is, in this case, the drag operation is performed when only the imaged fingertip point G is specified. When the drag operation is performed in the arrangement direction of the album window groups AW, AW', the title image of the present album window AW is successively switched to the title image of the album corresponding to the reserve album window group AW', and the switched title image is indicated. Simultaneously, the music indicated on the music list window LW is also successively switched. When the direction of the drag operation changes, the switching direction of the albums also changes. FIG. 23 shows the interface specification when a touch operation is performed. When the music name display area in the music list window LW is touched, the music of the touched music name is played. When the present album window AW is touched, a music subsequent to the presently selected music may be played.

Summarizing the above embodiments, an operation apparatus mounted to a vehicle for performing an input operation of an in-vehicle electronic device, the operation apparatus includes:

a touch input device having an operation surface configured to receive a touch operation of a fingertip of an operator and configured to detect an inputted touch point according to the touch operation;

an imaging device having an imaging area having coordinates uniquely corresponding to the operation surface, the imaging device configured to photograph a hand of the operator close to the operation surface;

an imaged fingertip point detection unit configured to detect a fingertip point of the hand as an imaged fingertip point based on hand image data of an image photographed and obtained by the imaging device;

an image display device including a display screen having coordinates uniquely corresponding to the operation surface and the imaging area;

an instruction object image indication control unit configured to indicate an instruction object image on the display screen and configured to show the fingertip point relative to the image display device;

an operation panel indication control unit configured to indicate an operation panel on the image display device, the operation panel being specific to the in-vehicle electronic device, which is an operated object;

a user interface engine having a prescribed interface specification being a relationship between an instruction input state and an operation instruction output content, the instruction input state being specified by at least one of the inputted touch point and the imaged fingertip point on the operation panel, the operation instruction output content being to be outputted to an in-vehicle electronic device, the user interface engine configured to output operation instruction information according to the interface specification and the instruction input state on the operation panel;

a traveling state detection unit configured to detect a traveling state of the vehicle; and an interface specification alteration unit configured to alter the interface specification of the user interface engine according to the detected traveling state.

According to the operation apparatus, the image display device indicates the operation panel specific to the in-vehicle electronic device, which is an operated object is indicated. Further, the user interface engine has the prescribed interface specification being a relationship between the instruction input state and the operation instruction output content. The instruction input state is specified by at least one of the inputted touch point and the imaged fingertip point on the operation panel. The operation instruction output content is to be outputted to an in-vehicle electronic device. The user interface engine is configured to output operation instruction information according to the interface specification and the instruction input state on the operation panel. The interface specification is altered according to the traveling state of the detected vehicle. Thus, an operativity of the operation apparatus for an in-vehicle electronic device can be arbitrary optimized according to the vehicle running state.

The interface specification alteration unit may be configured to alter an indicated content on the operation panel and the operation instruction output content corresponding to the indicated content according to the traveling state of the vehicle. Specifically, in a user interface such as a graphical user interface configured to detect a touch operation and an imaged fingertip point as inputted information on the operation panel, the interface specification alteration unit may alter the indicated content (visual structure) on the operation panel according to the traveling state of the vehicle. Thereby, an appropriate operation support can be performed even in an operation state, in which an operator cannot gaze at the screen of the operation apparatus in a specific vehicle running state.

Specifically, the traveling state detection unit may include a vehicle speed detection unit. Further, the interface specification may include a low-speed traveling interface specification and a high-speed traveling interface specification. The low-speed traveling interface specification is used when the vehicle stops or when the detected vehicle speed is less than or equal to a threshold. The high-speed traveling interface specification is used when the detected vehicle speed is greater than the threshold. The interface specification alteration unit may be configured to switch the interface specification to one of the low-speed traveling interface specification and the high-speed traveling interface specification according to the vehicle speed. When the vehicle speed is low, in particular, when the vehicle stops, a driver can frequently gaze at the operation panel for a long time. Contrary, when the vehicle speed is high, the driver must gaze at the front side, and it is hard to gaze at the operation panel for a long time. The low-speed traveling interface specification and the high-speed traveling interface specification are prescribed and switched according to the vehicle speed, which relates to a capability of the driver to gaze at the operation panel. Thereby, a suitable operativity can be secured according to the traveling state.

The operation panel indication control unit may be configured to form and indicate multiple operation regions such as a manual operation button and an input window on the operation panel for outputting different operation instructions. In this case, the interface specification alteration unit may be configured to set a formation and indication number of effective operation regions in the high-speed traveling interface specification to be less than a formation and indication number of effective operation regions in the low-speed traveling interface specification. In addition or alternatively, the interface specification alteration unit may be configured to set a formation and indication size of an effective operation region in the high-speed traveling interface specification to be larger than a formation and indication size of an effective operation region in the low-speed traveling interface specification. In a high-speed operation, a driver cannot easily gaze at the operation panel, and the driver is apt to grope the operation panel. In such a high-speed operation, when too many operation regions are indicated or when the size of the operation region is too small, a driver is apt to perform an erroneous operation. Such an erroneous operation can be effectively avoided by setting the formation and indication number and formation and indication size in the above manner.

The imaged fingertip point detection unit may be configured to simultaneously detect multiple fingertip points based on the hand image data. The operation panel indication control unit may be configured to increase a number of classifications of the operation regions formed and indicated on the operation panel, as a number of the detected fingertip points increases. Thus, diversity and efficiency of an operation input with multiple fingers can be enhanced by increasing the number of the classifications of the operation regions according to the number of the detected fingers. In particular, an operation region may be dynamically formed and set to a position corresponding to each fingertip point each time a fingertip point is detected. In this case, an operation region specific to each finger is set. Thus, a function of each finger can be clearly assigned, and a complicated input can be easily performed.

In this case, the interface specification alteration unit may be configured to set a maximum formation and indication number of operation regions in the high-speed traveling interface specification to be less than a maximum formation and indication number of the operation region in the low-speed traveling interface specification. In this case, an erroneous operation can be reduced by switching to the interface specification assigned with a small maximum formation and indication classification number in the low-speed traveling in which it is hard to gaze at the operation panel for a driver.

Alternatively, the operation panel indication control unit may be configured to detect a drag operation along the operation surface of the touch input device and may be configured to switch multiple effective operation regions, which respectively have different operation instruction output contents, and indicate the switched effective operation region on the screen. The interface specification alteration unit may be configured to continually switch the operation regions during one continuous drag operation in the low-speed traveling interface specification and may be configured to intermittently switch the operation regions each time one drag operation arises in the high-speed traveling interface specification. Since a driver can continually switch the operation regions by the drag operation while confirming the contents of the operation regions switched one after another, the driver can quickly specify a desired operation region. However, when a driver cannot easily gaze at the operation panel in the high-speed traveling state and when the operation regions are continually switched, a desired operation region may be skipped. Consequently, the driver cannot easily specify the desired operation region. Therefore, in the high-speed traveling interface specification, the operation regions are intermittently switched each time one drag operation arises, and thereby the driver can steadily specify the desired operation region.

The operation apparatus may further include an operation pattern detection unit configured to detect an operation pattern, which is a specific motion of the image fingertip point along the operation surface. In this case, the operation panel indication control unit may be configured to form and indicate multiple operation regions for outputting different operation instructions on the operation panel. The user interface engine may further include an operation instruction information output unit configured to output a first operation instruction information corresponding to an operation pattern on detection of the operation pattern and configured to output a second operation instruction information associated with an operation region on selection of the operation region by the inputted touch point or the imaged fingertip point. The interface specification alteration unit may be configured to activate at least the second operation instruction information according to selection of the operation region in the low-speed traveling interface specification and may be configured to activate only the first operation instruction information according to detection of the operation pattern in the high-speed traveling interface specification. According to the present configuration, in the low-speed traveling interface specification, a driver can select an operation region while looking at the operation panel. On the other hand, in the high-speed traveling interface specification, selection of an operation region is deactivated, and only an operation according to an operation pattern such as a gesture, which can be performed without gazing at the operation panel, is activated. Thus, an operativity is enhanced.

According to the embodiments, another operation apparatus mounted to a vehicle for performing an input operation of an in-vehicle electronic device, the operation apparatus includes:

a touch input device having an operation surface configured to receive a touch operation of a fingertip of an operator and configured to detect an inputted touch point according to the touch operation;

an imaging device having an imaging area having coordinates uniquely corresponding to the operation surface, the imaging device configured to photograph a hand of the operator close to the operation surface;

an imaged fingertip point detection unit configured to simultaneously detect multiple fingertip points of the hand as imaged fingertip points based on hand image data of an image photographed and obtained by the imaging device;

an image display device including a display screen having coordinates uniquely corresponding to the operation surface and the imaging area;

an instruction object image indication control unit configured to indicate an instruction object image on the display screen and configured to show the fingertip point relative to the image display device;

an operation panel indication control unit configured to indicate an operation panel on the image display device, the operation panel being specific to the in-vehicle electronic device, which is an operated object;

a user interface engine having a prescribed interface specification being a relationship between an instruction input state and an operation instruction output content, the instruction input state being specified by at least one of the inputted touch point and the imaged fingertip point on the operation panel, the operation instruction output content being to be outputted to an in-vehicle electronic device, the user interface engine configured to output operation instruction information according to the interface specification and the instruction input state on the operation panel; and an interface specification alteration unit configured to alter the interface specification of the user interface engine according to a number of the imaged fingertip points detected by the imaged fingertip point detection unit.

The interface specification of the user interface engine is altered according to the number of the imaged fingertip points. Thus, the input specification can be optimized according to the number of the detected fingers. The operation panel indication control unit may be configured to form multiple operation regions for outputting different operation instructions and may be configured to indicate the multiple operation regions on the operation panel. In this case, the interface specification alteration unit may be configured to set a formation and indication number of an effective operation region when multiple imaged fingertip points are detected by the imaged fingertip point detection unit to be greater than a formation and indication number of an effective operation region when one imaged fingertip point is detected. Thus, diversity and efficiency of an operation input with multiple fingers can be enhanced by increasing the number of the classifications of the operation regions according to the number of the detected fingers.

According to the embodiments, another operation apparatus mounted to a vehicle for performing an input operation of an in-vehicle electronic device, the operation apparatus includes:

a touch input device having an operation surface configured to receive a touch operation of a fingertip of an operator and configured to detect an inputted touch point according to the touch operation;

an imaging device having an imaging area having coordinates uniquely corresponding to the operation surface, the imaging device configured to photograph a hand of the operator close to the operation surface;

an imaged fingertip point detection unit configured to detect a fingertip point of the hand as an imaged fingertip point based on hand image data of an image photographed and obtained by the imaging device;

an image display device including a display screen having coordinates uniquely corresponding to the operation surface and the imaging area;

an instruction object image indication control unit configured to indicate an instruction object image on the display screen and configured to show the fingertip point relative to the image display device;

an operation panel indication control unit configured to indicate an operation panel on the image display device, the operation panel being specific to the in-vehicle electronic device, which is an operated object;

a user interface engine having a prescribed interface specification being a relationship between an instruction input state and an operation instruction output content, the instruction input state being specified by at least one of the inputted touch point and the imaged fingertip point on the operation panel, the operation instruction output content being to be outputted to an in-vehicle electronic device, the user interface engine configured to output operation instruction information according to the interface specification and the instruction input state on the operation panel; and an interface specification alteration unit configured to alter the interface specification of the user interface engine according to whether a touch operation to the touch input device is simultaneously detected when an imaged fingertip point is detected.

According to the present configuration, by utilizing the two operation input systems including the touch input device and the imaging device for a hand, the interface specification of the user interface engine is altered (changed) according to whether the touch operation to the touch input device is simultaneously detected when an imaged fingertip point is detected. Therefore, the input form of the operation apparatus can be significantly extended.

More specifically, the operation panel indication control unit may be configured to detect a drag operation along the operation surface of the touch input device and may be configured to perform a scroll indication of image information, which is being indicated on the screen of the display device, in a direction corresponding to the drag operation. In this case, the interface specification alteration unit may be configured to set a scroll speed of the image information when the touch operation is detected simultaneously with the imaged fingertip point to be lower than a scroll speed when the touch operation is not detected. The scroll speed of the screen can be switched easily and intuitively according to whether an operator drags while touching the operation surface or the operator drags without touching the operation surface.

Alternatively, the operation panel indication control unit may be configured to detect a drag operation along the operation surface of the touch input device and may be configured to perform a scroll indication of a hierarchical information output menu being indicated on the screen of the display device. The interface specification alteration unit may be configured to perform a scroll indication of a different hierarchy of the information output menu according to whether the touch operation is detected or the touch operation is not detected. An operator switches between an operation of dragging while touching the operation surface and an operation of dragging without touching the operation surface thereby to alter the hierarchy of the scrolled-indicated information output menu. Therefore, convenience of the menu search can be significantly enhanced.

The above structures of the embodiments can be combined as appropriate.

The above processings such as calculations and determinations are not limited being executed by processing units such as the CPU 101, the ECUs 200, 300. The control unit may have various structures including the CPU 101, the ECUs 200, 300 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. An operation apparatus mounted to a vehicle for operating an in-vehicle electronic device, the vehicle having the in-vehicle electronic device and a display device, the operation apparatus comprising:

an input device having an operation surface configured to receive a touch operation of an operator to detect a touch point specified by the touch operation;

a fingertip detection unit configured to detect a fingertip of a hand of the operator, when the hand is close to the operation surface; and a control device configured to, when only the fingertip is detected to move by a drag operation without any touch operation, control the display device to successively switch an image displayed on the display device in accordance with a direction of the drag operation, wherein the control device is configured to, when the fingertip and the touch operation are detected at a same time and at a same point, select the image displayed on the display device and output an instruction that the image displayed on the display device is selected to the in-vehicle electronic device, wherein the image is one of a plurality of images arranged in an arrangement direction, and the control device controls the display device to successively switch the plurality of images displayed on the display device in accordance with the direction of the drag operation, when only the fingertip is detected to move by the drag operation without any touch operation.

2. The operation apparatus according to claim 1, wherein the in-vehicle electronic device is a car audio system, the plurality of images includes a present album window which is displayed on the display device and a reserve album window group which is different from the present album window, and the control device controls the display device to display a music list of the present album window on a lower side of the present album window.

3. The operation apparatus according to claim 2, wherein the control device outputs a signal to the car audio system to play music indicated by the touch operation when the touch operation is detected in an area of the operation surface corresponding to the music list.

4. The operation apparatus according to claim 2, wherein the control device outputs a signal to the car audio system to play music subsequent to a presently selected music when the touch operation is detected in an area of the operation surface corresponding to the present album window.

5. The operation apparatus according to claim 1, wherein the fingertip detection unit detects the fingertip of the hand of the operator when the hand is close to but not touching the operation surface.

\* \* \* \* \*